US010086539B2

(12) United States Patent
Robles et al.

(10) Patent No.: US 10,086,539 B2
(45) Date of Patent: Oct. 2, 2018

(54) SYNTHESIS OF EFFECTIVE CARBON NANOREINFORCEMENTS FOR STRUCTURAL APPLICATIONS

(71) Applicant: University of Houston System, Houston, TX (US)

(72) Inventors: Francisco C. Robles, Houston, TX (US); Hector A. Calderon, Mexico DF (MX); Anderson Okonkwo, Houston, TX (US)

(73) Assignee: University of Houston System, Houston, TX (US)

( * ) Notice: Subject to any disclaimer, the term of this patent is extended or adjusted under 35 U.S.C. 154(b) by 415 days.

(21) Appl. No.: 14/669,378

(22) Filed: Mar. 26, 2015

(65) Prior Publication Data

US 2016/0001471 A1    Jan. 7, 2016

Related U.S. Application Data

(60) Provisional application No. 61/970,026, filed on Mar. 25, 2014.

(51) Int. Cl.
*B29C 43/00*    (2006.01)
*B22F 3/02*    (2006.01)
(Continued)

(52) U.S. Cl.
CPC ............ *B29C 43/006* (2013.01); *B82Y 30/00* (2013.01); *C01B 32/15* (2017.08); *C01B 32/184* (2017.08);
(Continued)

(58) Field of Classification Search
CPC . C03C 14/002; C03C 2214/16; C01B 32/184; C01B 32/15; C01B 32/20;
(Continued)

(56) References Cited

U.S. PATENT DOCUMENTS 5,648,056 A * 7/1997 Tanaka .................. B82Y 30/00
423/445 B

FOREIGN PATENT DOCUMENTS

EA    200800197 A1    6/2008
RU    2434033 C2    6/2011

OTHER PUBLICATIONS

Fang, et al., Covalent polymer functionalization of graphene nanosheets and mechanical properties of composites, J. Mater. Chem. 2009; 19: 7098-7105.*

(Continued)

*Primary Examiner* — Daniel C McCracken
(74) *Attorney, Agent, or Firm* — Ramey & Schwaller, LLP

(57) ABSTRACT

A methodology is disclosed to produce nanostructured carbon particles that act as effective reinforcements. The process is conducted in the solid state at close to ambient conditions. The carbon nanostructures produced under this discovery are nanostructured and are synthesized by mechanical means at standard conditions. The benefit of this processing methodology is that those carbon nanostructures can be used as effective reinforcements for composites of various matrices. As example, are to demonstrate its effectiveness the following matrices were including in testing: ceramic, metallic, and polymeric (organic and inorganic), as well as bio-polymers. The reinforcements have been introduced in those matrices at room and elevated temperatures. The raw material is carbon soot that is a byproduct and hence abundant and cheaper than pristine carbon alternatives (e.g. nanotubes, graphene).

9 Claims, 18 Drawing Sheets

(51) Int. Cl.
| | |
|---|---|
| *C04B 35/645* | (2006.01) |
| *B22F 3/10* | (2006.01) |
| *B82Y 30/00* | (2011.01) |
| *C08K 3/04* | (2006.01) |
| *C04B 35/00* | (2006.01) |
| *C04B 35/626* | (2006.01) |
| *C03C 14/00* | (2006.01) |
| *C22C 1/10* | (2006.01) |
| *C22C 26/00* | (2006.01) |
| *C01B 32/15* | (2017.01) |
| *C01B 32/20* | (2017.01) |
| *C01B 32/184* | (2017.01) |
| *B82Y 40/00* | (2011.01) |
| *B29L 31/30* | (2006.01) |
| *B29L 31/34* | (2006.01) |

(52) U.S. Cl.
CPC ............ *C01B 32/20* (2017.08); *C03C 14/002* (2013.01); *C04B 35/00* (2013.01); *C04B 35/6261* (2013.01); *C04B 35/645* (2013.01); *C08K 3/04* (2013.01); *C22C 1/1084* (2013.01); *C22C 26/00* (2013.01); *B29L 2031/3055* (2013.01); *B29L 2031/3076* (2013.01); *B29L 2031/34* (2013.01); *B82Y 40/00* (2013.01); *C03C 2214/02* (2013.01); *C03C 2214/16* (2013.01); *C04B 2235/422* (2013.01); *C04B 2235/425* (2013.01); *C04B 2235/427* (2013.01); *C04B 2235/5409* (2013.01); *C22C 2026/001* (2013.01)

(58) Field of Classification Search
CPC .......... B82Y 30/00; B82Y 40/00; C08K 3/04; C04B 35/00; C04B 35/6261; C04B 35/645; C04B 2235/422; B22F 3/02; B22F 3/10; B29C 43/006; C22C 1/1084; C22C 26/00
See application file for complete search history.

(56) References Cited

OTHER PUBLICATIONS

Fitzer, et al., Recommended Terminology for the Description of Carbon as a Solid, Pure & Appl. Chem. 1995; 67(3): 473-506.*
Rafiee, et al., Fullerene-epoxy nanocomposites-enhanced mechanical properties at low nanofiller loading, J. Nanopart. Res. 2011; 13: 733-737.*
Compound Summary for CID 123591 Fullerene, accessed online at https://pubchem.ncbi.nlm.nih.gov/compound/Buckminsterfullerene#section=Top on Dec. 26, 2017.*
Oliver, W.C. et al.; Measurement of Hardness and Elastic Modulus by Instrumented Indentation: Advances in Understanding and Refinements to Methodology; Journal of Materials Research; Mar. 2003; pp. 3-20; vol. 19; No. 1.
Bushev, Yu.G et al., Carbon-Carbon Composite Materials, Refernce book, Moscow, Metallurgiya, 1994, p. 15.
International Search Report and Written Opinion dated Aug. 6, 2015, issued in PCT/US15/022696.
Kwangmin Choi et al., Mechanical Properties of Aluminum-based Nanocomposite Reinforced with Fullerenes, 9th International Conference on Fracture & Strength of Solids, Jun. 9-13, 2013, Jeju, Korea.
Slutsky E. M., Adsorptive Properties of Nanostructured Fullerene Carbon-Based Materials, Abstract of theses for the scholastic degree of Candidate of Chemical Sciences, Saint-Petersburg, 2005, p. 8-9, table 1-2.
Bushev, Yu.G et al., Carbon-Carbon Composite Materials, Reference book, Moscow, Metallurgiya, 1994, p. 15.
Potalitsin, M.G. et al., Modifying Caprolon by Fulleroid Materials, Questions of Materials Science, 2006, No. 2(46), pp. 153-157, abstract.

* cited by examiner

SYNTHESIS OF EFFECTIVE CARBON NANOREINFORCEMENTS FOR STRUCTURAL APPLICATIONS

RELATED APPLICATIONS

This application claims priority to, and incorporates by reference, U.S. Provisional Application No. 61/970,026, filed Mar. 25, 2014.

FIELD

The embodiments disclosed herein involve the development of novel carbon reinforcements. Those reinforcements are ideal for applications in composites. The reinforcement is effective for ceramics, polymers (organic inorganic, and bio-compatible), and metals. Therefore, this reinforcement can be used for any of the above mentioned matrices.

BACKGROUND

Carbon nanostructures as fullerene, nanotubes, and graphene have been widely used to reinforce different inorganic matrices (e.g. polymers (organic, inorganic and bio-), metals, concretes, ceramics, etc.) thus producing composites with improved mechanical or multifunctional properties. The most common polymer matrices include, epoxy, polyester, polyvinyl, pure carbon (graphene, amorphous, graphitic), polyethylene, etc. Carbon nanotubes have demonstrated mechanical improvements on polymers matrix composites such as strength, toughness, elongation, Young's modulus, wear. Further improvements are reported on conductivity, in both DC and AC modes. Proper functionalization of carbon nanostructures provides further enhancement of the mechanical properties of composites. In polymers, the interactions (i.e. chemical) among the reinforcement and matrix may result in further enhancement of the mechanical properties. Carbon particles (e.g. nanotubes or graphenes) can be the key to trigger polymeric matrices with multifunctional character for manufacturing of lightweight components for advanced applications (aerospace, electronics, automotive etc.). However, the literature highlights that a serious limitation in this type of composites is represented by the inefficient dispersion of the nanotubes in the host matrix.

Several efforts had been conducted to reinforce composites with carbon for decades. Carbon-carbon composites were first developed by introducing fibers in carbonaceous matrices known for their exceptional thermal shocks, wear, ablation, toughness, high temperature, and friction resistant properties. The fibers have strengths of up to 4 times that of advanced steels (up to 4 GPa). These composites are useful for aerospace, defense among other applications. Traditionally, the synthesis of carbon nanostructures (fullerene, nanotubes and graphene) is conducted by evaporation of carbon. Those carbon nanostructures are known for their outstanding mechanical electrical and thermal characteristics. The carbon nanotube opened new horizons for structural materials to reinforce textiles, polymers, metals and ceramics. On those early stages the hardness in metallic matrices had been improved in up to 800%. More recent reports show toughness improvements in ceramic matrix composites between 300% and 500% with electrical property improvements of more than 12 orders of magnitude.

The development of carbon nanostructures to reinforce composites is a strategy for producing a new generation of materials with superior mechanical properties. Carbon nanotubes are the most investigated particles with positive results. However, the improvements in mechanical properties are below theoretical expectations. Similar results are found with graphene. The scientific community has been using pristine quality carbon nanostructures to reinforce composites. Pristine quality carbon nanostructures possess outstanding properties; unfortunately, these properties are affected by the particle's integrity thereby limiting choice of manufacturing methods. Further, carbon nanotubes have discrete reinforcement effects. In order to achieve effective reinforcement it is necessary to develop an interconnected network of the reinforcement that guarantee intimate interaction with the matrix. The ideal carbon reinforcement should possess the following characteristics: 1) large surface area, 2) malleability, 3) resistance to thermo mechanical processing, 4) limited reactivity with the matrix, 4) easy to synthesize and manipulate, 5) in situ transformations into nanotubes, fibers, etc., and 6) potential for mass production and cost effective. From the above list the most important properties are mass production and the particle's ability to transform in situ in order to guarantee effective reinforcement.

SUMMARY

The embodiments of the invention disclosed herein relate to a method of synthesizing carbon nano-reinforcement material. In these embodiments, the method comprises the steps of obtaining fullerene soot with less than 10% by weight of fullerene and subjecting the soot to mechanical milling for between 0 and 50 hours to obtain a milled product.

Still further, in certain embodiments to synthesize a carbon nano-reinforcement material, the milled product is combined with at least one matrix powder.

In embodiments of the invention concerning the matrix powder, the matrix powder can be a metal, a ceramic, a glass, an inorganic polymer, an organic polymer, a biopolymer or a combination thereof. In certain specific embodiments, wherein the matrix powder is a bio-polymer, the bio-polymer is chitosan.

In embodiments of the invention concerning the milling process, in certain embodiments, the milling process is between 2 and 10 hours and the milled product comprises graphitic and amorphous carbon. In such embodiments, the milled product comprises less than 15% by weight of sp3 bonded carbon species after milling.

In still further embodiments of the invention concerning the milling process, the milling process is between 0 and 2 hours and the milled product comprises graphenes and graphitic carbon less than percentage 8% by weight of sp3 bonded carbon after milling.

In other embodiments of the invention concerning the milling process, the process is greater than 10 hours and less than 50 hours. In such embodiments, the milled product comprises nanodiamonds. In such embodiments, the milled product comprises greater than 15% by weight of sp3 bonded carbon species after milling.

In still further embodiments concerning the milling, ethanol is added to the fullerene soot during the milling process. In such embodiments, the milled product has a larger surface area with which to interact with the one or matrix powder. In certain embodiments, the milled product possesses a surface area of approximately 270 $m^2/g$ or greater.

In greater specificity, in certain embodiments, when combining the at least one matrix powder, this step is accomplished while the soot is being subjected to mechanical milling. In other embodiments, the milled product is combined with the one or more matrix powder and subjected to a second milling as an alternative.

In certain further embodiments, the method disclosed herein further comprises sintering after the step of combining the milled product with at least one matrix powder to generate the carbon nano-reinforcement material.

In another embodiment, the invention concerns a reinforced polymer matrix, the polymer matrix made by combining carbon soot with a liquid polymer matrix to form a complex and hardening the complex to form a reinforced structure.

In certain aspects of the aforementioned embodiment, at least 90% of the carbon soot is sp2 bonded in the reinforced polymer matrix. In certain further aspects concerning the soot, the density of the carbon soot is about 0.2 to 2 g/cm$^3$.

In embodiments of the aforementioned invention, the reinforced structure comprises 1% by weight of soot. In such embodiments, the reinforced structure has properties different than a hardened polymer structure that has not been reinforced with soot. For example, in certain embodiments, the addition of soot increases the tensile strength. In other aspects, wherein the reinforced structure comprises 0.2% by weight of soot, the addition of the soot increases the plasticity at least by 10%. Still further, the soot increases the average elastic modulus by at least 15% over the hardened polymer structure that has not been reinforced with soot; and increases the hardness by at least 20%.

In other embodiments of the invention, the reinforced structure comprises 3% by weight of soot. In such embodiments, the addition of the soot increases the plasticity at least by 6% over a hardened polymer structure that has not been reinforced with soot. Still further, the soot increases the average elastic modulus by at least 8% over the hardened polymer structure that has not been reinforced with soot; and increases the hardness by at least 10%.

BRIEF DESCRIPTION OF THE DRAWINGS

In order that the manner in which the above-recited and other enhancements and objects of the invention are obtained, we briefly describe a more particular description of the invention rendered by reference to specific embodiments thereof which are illustrated in the appended drawings. Understanding that these drawings depict only typical embodiments of the invention and are therefore not to be considered limiting of its scope, we herein describe the invention with additional specificity and detail through the use of the accompanying drawings.

DETAILED DESCRIPTION

Figure 1:
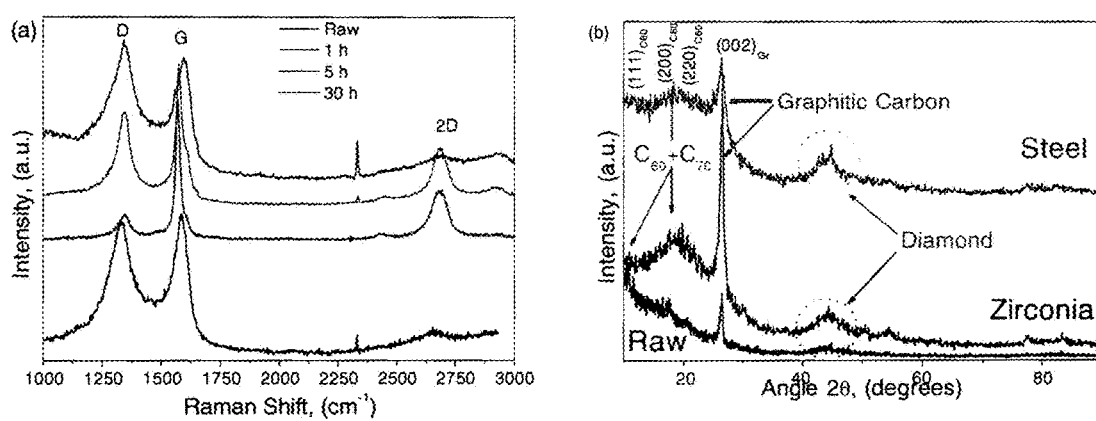
FIG. 1. Characterization of the soot in the raw and milled conditions by means of (a) Raman and (b) XRD. Note: the milling times for (b) the XRD are 2 hours and illustrate that milling media (steel vs zirconia) have a direct effect on the characteristics of the produced carbon nanostructures. Therefore, milling time changes depending on the milling media. Steel in this case synthesizes the graphene and graphitic carbon faster than zirconia.

In the embodiments of the invention disclosed herein, a methodology has been identified to produce nanostructured carbon particles that act as effective reinforcements.

In certain embodiments, the process is conducted in the solid state at close to ambient conditions. The carbon nanostructures produced under this embodiment are nanostructured and are synthesized by mechanical means. The milling is carried at room temperature. More specifically, the reinforcements consists of graphene, graphitic carbon and nano diamonds that are synthesized in situ during mechanical milling and then subjected to sintering to further enhance their effectiveness as reinforcement improving the intimacy with the carbon matrix.

The benefit of this processing methodology is that those carbon nanostructures behave as effective reinforcements when added to different matrix and sintered. This demonstrates its effectiveness in a wide variety of matrices including, but not limited to: ceramic, metallic, and polymeric (organic and inorganic), as well as bio-polymers. The reinforcements have been introduced in those matrices at room at elevated temperatures. The raw material is carbon soot that is a byproduct and hence abundant and cheaper than pristine carbon alternatives (e.g. nanotubes, graphene).

In standard practice, carbon nano-reinforcements are usually produced by evaporation (e.g. fullerene, nanotubes, graphenes, etc.) the processing methods are costly and in some cases toxic. In addition, the processing techniques do not allow production of more than fractions of a gram per hour.

In the embodiments of the invention disclosed herein, abundant carbon nanostructures are produced mechanically. In such embodiments, the several grams to kilograms of the carbon nanostructures are produced per hour. In still further embodiments, the mechanically produced carbon nanostructures can be scaled up such that the carbon nanostructures can be produced on the mega-gram scale per hour. In such embodiments, scale up entails increasing the amount of fullerene soot, increasing the number of milling apparatuses, increasing the size of the milling apparatuses, increasing the surface area of the soot to the milling process, or some combination thereof.

In certain embodiments, the aforementioned mechanically produced carbon nanostructures are used as filler. More specifically, they are employed as filler for composites which allows the carbon nanostructures to complete their physicochemical interactions during processing. In certain embodiments wherein the carbon nanostructures are fillers, the carbon nanostructures behave as effective reinforcements and are effective in a wide variety of matrices including, but not limited to: ceramic, metallic, polymeric (organic and inorganic), as well as bio-polymers.

The processing can be conducted at room or elevated temperatures. For example, at room temperature this material has been tested using polymeric matrices and at elevated temperature we have used metals, ceramics, inorganic polymers (carbon), and bio-polymers (chitosan). Other carbon reinforcements (fullerene, nanotubes, graphene, fibers. etc.) have never demonstrated such level of effectiveness.

The embodiments of the invention disclosed herein not only reduce cost, but also facilitate direct implementation at the industrial level with minor modifications. In application, the manufacturing is non-toxic as compared to other carbon nanostructures that required toxic procedures.

In prior applications the use of other nano-reinforcements required sophisticated equipment for synthesis. Additionally, with the requirement that the manufacturing process should prevent physical damage to the reinforcement, the mechanical and the general physical properties of the other carbon nano-reinforcements are only preserved as long as the integrity of the reinforcement is not compromised. This limits the manufacturing methods that can be used to industrialize or commercialize the final products.

The embodiment disclosed herein allow for integration of the reinforcement into the matrix with currently available technologies. In our case, the proposed reinforcement can be integrated into the matrix with currently available technologies. We identify that this reinforcement does not require special processing techniques to be used.

The invention disclosed herein can have variable amounts of graphitic and diamond or diamond-like carbon structures. Both, the graphitic and diamond structures act as reinforcements that improve the strength of the matrices where they are added. The processing methodology that we follow is comprised of mechanical milling of the commercial soot. During short time milling the soot agglomerates by welding which are needed as pre-conditioning state to form the carbon nanoreinforcements.

The agglomeration sponsors the synthesis of graphene-like particles. Results indicate that milled soot follows this sequence as a function of time: a) 0-5 h amorphous carbon, graphene and graphitic carbon, b) 5-10 h amorphous carbon, graphitic carbon and nano-diamonds (less than 15 percent by weight sp3 bonds), c) 10+h amorphous carbon, graphitic carbon and nanodiamonds (less than 15 percent by weight sp3 bonds). However, this is quite dependable of the milling media (e.g. using a high energy SPEX mill, steel vials and milling media). Further, as the milling time increases, the contamination from the milling media may increase. Those times change for ceramic and for tungsten carbide milling media. Further, this can be escalated to an industrial set up, and the times can be adjusted then.

The graphene, graphitic carbon and the diamond are of interest for the reinforcements because they play different roles. The graphene and graphitic carbon have the largest aspect ratio; therefore, they are more efficient to coat the matrix particles. In certain embodiments transition metals are added to the blend as catalyst. Those metals act as hetero-nuclei to synthesize nanotubes and nanofibers during sintering. The nano-diamonds act as locally to harden the composite.

In certain embodiments, the production of milled powders with catalysts in the amount of 1-50 wt % (iron, nickel, or copper) are employed. Chemical reactions among the catalyst and carbon must be prevented; hence, milling time as well as sintering time and temperature is critical. In certain embodiments, the excessive agglomeration of the carbon particles is prevented by adding a control agent (e.g. ethanol) during milling; after milling the particles can be dispersed by sonication in liquid media. Keeping the powder loose is important because the larger the surface area the better the reinforcement will be to coat the matrix particles. In certain embodiments, the surface area of the milled particles can be up to 270 m$^2$/g.

In certain further embodiments, milled and/or sonicated powders are used directly in suspension by adding the matrix powders to the suspension followed by a second sonication. In other embodiments, the powders are dried out and milled again to generate the coating along the matrix particles. In certain embodiments, sonication is conducted in alcohol to disperse the powders to increases their surface area. The dried powders can be added to a second milling with the matrix of the particles to guarantee their integration. Examples of dried powders include: metals, ceramics, glasses, inorganic polymers (carbon), bio-polymers (e.g. chitosan), etc. The carbon powders are engineer to resist mechanical milling, which as of today has not been possible with other types of carbon (e.g. nanotubes or graphene). In the case of organic polymers (e.g. epoxies) the powder can be added directly to the liquids and mixed them thoroughly until they are integrated and homogeneously distributed within the liquid. The milled powders can then be sintered or the organic polymers can be allowed to set.

In certain embodiments, the reinforcement additions will vary from 1 to 20 wt %. In embodiments, wherein organic polymers are used, we have added up to 13 wt % with positive results.

EXAMPLES

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit or scope of the invention. The following Examples are offered by way of illustration and not by way of limitation.

Example 1

Characterization of all Carbon Composites Reinforced with In Situ Synthesized Carbon Nanostructures Materials and Methods The purchased fullerene soot is produced by the Kratschmer method having traces (less than 1 wt %) of fullerene. The fullerene soot is the byproduct obtained after the purification of fullerene.

Methods

Mechanical milling is carried on the soot using a SPEX mill and steel hardened media for times from 0-50 h. After mechanical milling the powders are sonicated on a Misonix 4000 apparatus operated at 10-50 W for 2-30 min. The spark plasma sintering (SPS) conditions have been: temperature 1500° C., 60 s, and heating rate of 140° C./s and a constant pressure of 100 MPa. The average dimensions of the sintered samples are 12 mm in diameter and 3 mm in thickness. The nanohardness apparatus is a Hysitron TI-900 TriboIndenter™ system that provides real-time data collection. A series of 9 measurements are made in an array allowing 15 µm each side among indentation using 7000 µN.

The X-ray diffraction (XRD) is carried on a D5000 SIEMENS diffractometer, with a characteristic $\lambda^{Cu}K_\alpha$=0.15406 nm operated a 40 kV and 30 A. The Scanning Electron Microscopy (SEM) observations are carried out on a FEI XL-30FEG on secondary electrons. The transmission electron microscope (TEM/HRTEM) for the raw soot is conducted on a JEOL JEM200FXII and atomic resolution is conducted in the TEAM 05 microscope from the Lawrence National Laboratory. The Raman characterization is done on a confocal micro-Raman microscope XploRA™, Horiba JY. The lasers used for the Raman excitation include the following wave lengths: 532 nm. The x-ray photoelectron spectroscopy (XPS) is conducted on a Physical Electronics XPS Instrument Model 5700. The XPS is operated via monochromatic Al-$K_\alpha$ X-ray source (1486.6 eV) at 350 W.

Results

FIG. 1 shows the Raman characterization of the raw and milled powders and the Raman lines for D, G and 2D bands of graphitic (sp$^2$) carbon located at 1318 cm$^{-1}$, 1578 cm$^{-1}$, and 2660 cm$^{-1}$, respectively. The Raman spectrum shows that the 2D and D bands change with milling time. Short milling times are ideal to synthesize relatively large graphene or graphitic carbon. We estimated that the average lateral size of graphitic particles varies from $L_\alpha$ ~40 to 70 nm using the expression: $L_\alpha(nm)=(2.4\times10^{-10}\lambda^4_{las})(I_G/I_D)$, where $L_{las}$=532 nm is the excitation laser wavelength, and IG and ID are the Raman intensity of the D and G bands, respectively [19]. The XRD reflections (111), (200), and (220) are characteristic of fullerene, a mix of C$_{60}$ and C$_{70}$. Further, fullerene is identified by Raman and XRD, but its presence is in amounts of less than 1 wt %. The milled powders show a development of ordered structures as a function of milling time; though, this also depends on the milling media. In the early stages of milling the quasi-amorphous carbon agglomerate forming double and triple graphene layers. The increase in the ratio D/2D bands indicates the presence of graphene and graphitic carbon.

Figure 2:
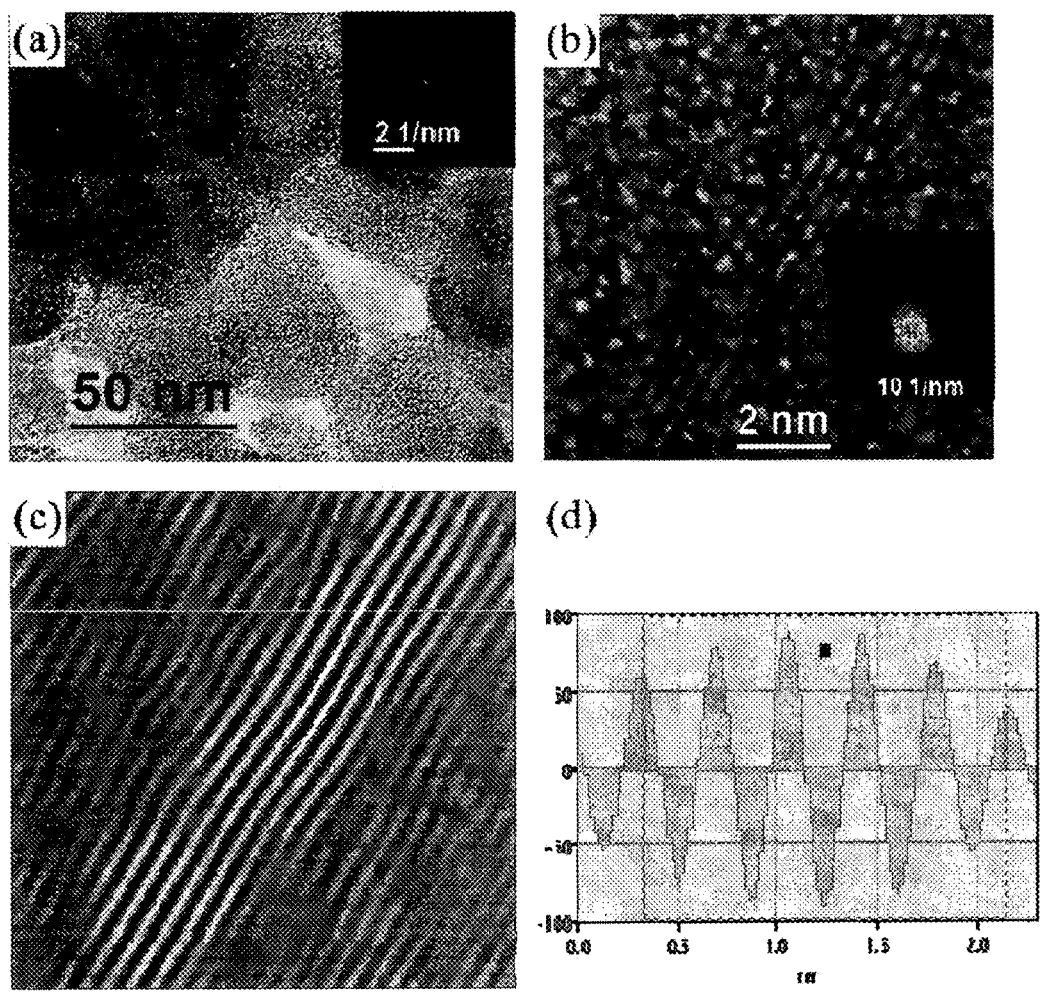
FIG. 2. High resolution electron transmission microscopy (HRTEM) of the (a) raw soot and (b-d) milled soot. In (b) is observed a graphitic particle responsible for the reflections identified in the Fast Fourier Transformation (FFT) pattern in the insert (see arrows and dotted circles). (c) The Inverse FFT of the identified reflection clearly reveals the presence of the graphitic structures in the investigated powder and the corresponding d-spacing analysis is presented in (d) with a value of 0.335 nm.

FIG. 2 shows images of the milled and raw soot. Both samples are analyzed by means of HRTEM. The raw sample is clearly amorphous and any short range ordered structures are attributed to the presence of bezoic-like rings as seen in the XRD patter. After the milling the samples develop larger range ordered structures with graphitic structures that are identified in FIG. 2. In the milled powders the presence of graphitic particles is evident with interplanar distances (d-spacing) from 0.334 to 0.373 nm. The actual d-spacing for graphitic carbon is approximately 0.335 nm the reported differences herein are attributed to residual stresses. The residual stresses are the result of excessive bending among the particles. Those graphitic structures are the main contributors to effective reinforcement for composites.

The XPS results of the raw and milled material provide evidence that the amount of sp3 bonding increases with milling time up to 20 h; after that it decreases. This is in agreement with Raman. The drop in sp³ bonding at milling times of more than 20 h is due to chemical reactions with Fe that is contamination from the milling media. The Fe contamination increases with the presence of diamond forcing chemical reactions among the components that produce $Fe_3C$. The sp3 bonding is in part due to the presence of diamonds; however, some sp3 bonding is due to dangling bonds on carbon. The rest of the carbon (sp2) is a mix of amorphous, graphene and graphitic carbon. In the present work the emphasis is on the graphitic particles because they induce novel mechanisms with unique elastic characteristics.

Table 1 shows the XPS results of the milled samples at various times. The presence of iron (Fe) is the result of contamination due to the milling media. The oxygen present in the sample is identified forming various carbon species such as: C—O—H, C—O—H, CHn, C=O.

TABLE 1

| Milling Time | Elements | | | Carbon Species | |
|---|---|---|---|---|---|
| (h) | C (at %) | O (at %) | Fe (at %) | Sp2 wt % | Sp3 wt % |
| 0 | 94 | 6 | 0 | 95.75 | 4.25 |
| 0.5 | 90.7 | 9.3 | 0 | 87.99 | 12.01 |
| 2 | 88.43 | 11.57 | 0 | 87.07 | 12.93 |
| 10 | 83.27 | 16.25 | 0.48 | 84.2 | 15.8 |
| 20 | 83.87 | 15/5 | 0.63 | 81.75 | 18.25 |
| 50 | 87.3 | 12.7 | 3.31 | 91.25 | 8.72 |

Sintered Composites

The sintering conditions are selected to preserve the nanostructured nature of the composites while achieving high density. The densities in the sintered samples vary depending on the milling conditions and sonication; though, in all the cases the density is above 2 g/cm³ that is comparable to that observed in graphite (2.09-2.23 g/cm³).

Figure 11:
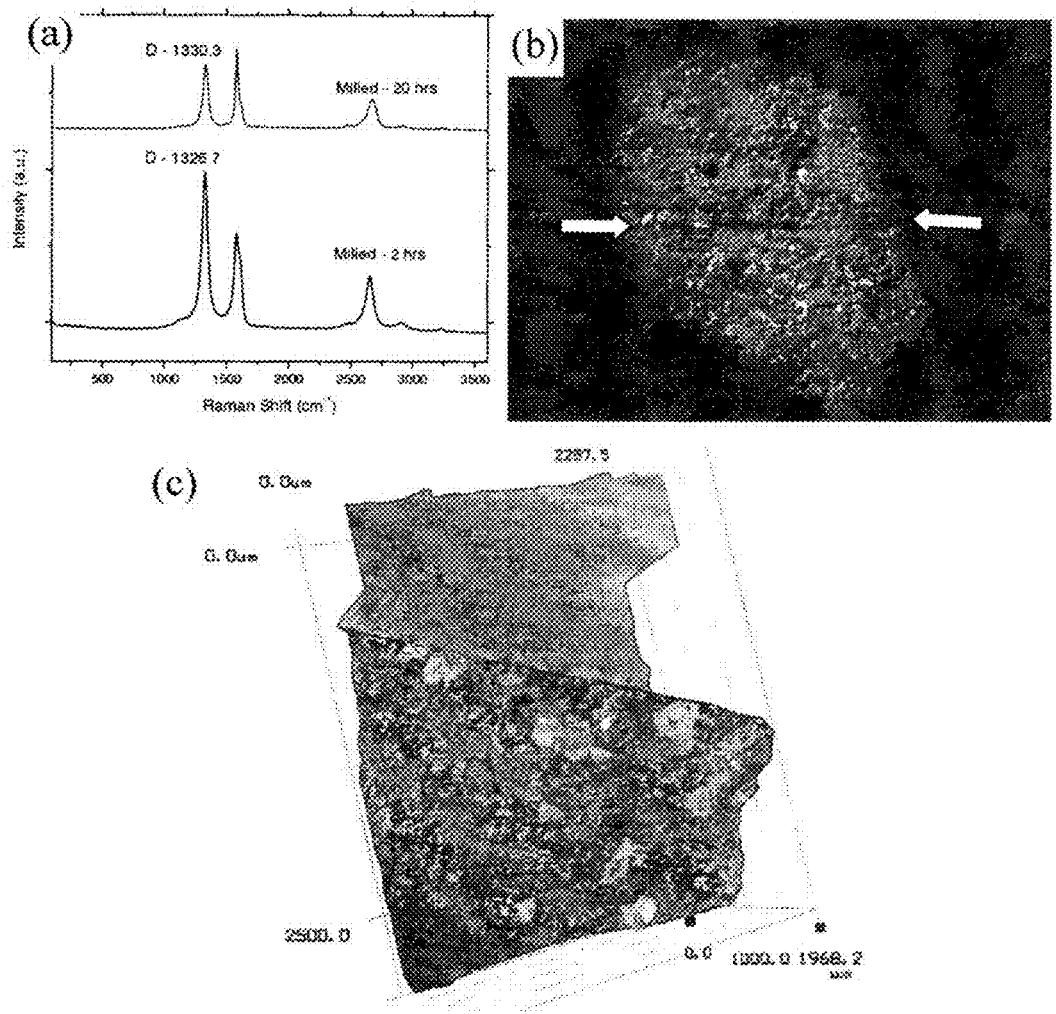
FIG. 11. Characterization of SPS samples by means of (a) Raman spectroscopy, (b) TEM dark field mode, and (c) confocal image of a microhardness indentation. The arrows in (b) point towards the direction of deep scratches made with the ion mill during samples preparation. The particles (encircled) show no damage demonstrating its high hardness that it is attributed to its diamond nature. The bright particles in (c) are presumably micro diamonds found in the sintered samples.

The characterization of the sintered sample is presented in FIG. 11. In this figure are presented Raman, TEM and a confocal image of the microhardness testing results. The Raman spectrum shows two main characteristics: i) the first is the intensity of the 2D band clearly demonstrating the presence of the graphitic structures at short milling times, likely graphene and ii) the position of the D band that is similar to that reported for diamond (1334 cm⁻¹) [25], at larger milling times. The presence of diamond is further confirmed by the dark field images in FIG. 4b. In FIG. 4c the diamonds are observed as translucent crystals when under the optical microscope in confocal mode. The dark field image presents "scratches" (indicated by an arrow) along the sample. The scratches result from the ion milling device preparation. The ion mill scratches show clear cuts through the carbon matrix (blend of amorphous and graphitic carbon); though, it does not incur any visible damage onto the "bright" particles. This is a clear demonstration of the high hardness of those particles that are presumably identified as diamonds. The differences in mechanical properties among the graphitic and amorphous carbon structures and diamond may be responsible for the fracture presented in FIG. 11c. This fracture occurred during microhardness testing. The fracture shows the internal microstructure of the sintered samples exposing a large density of translucent crystals presumably microdiamonds.

SUMMARY

In the mechanical milling of fullerene soot phases such as graphitic carbon and diamond can be synthesized. Short milling times are recommended to synthesize graphitic carbon (likely sp2). Larger milling times are more effective to increase the presence of sp3 bonding. The Sp3 bonding is attributed to diamond and dangling bonds in the thermomechanically processed samples. The presence of graphitic carbon and diamond were successfully characterized by means of XRD, Raman and TEM. Through a systematic material characterization we identify a novel manufacturing route to for carbon reinforcements produced in situ in a carbon matrix. The mechanical effects to synthesize graphitic carbon and diamond are further enhanced during SPS.

Example 2

Chitosan and Chitosan Composites Reinforced with Carbon Nanostructures

Methods

Figure 3:
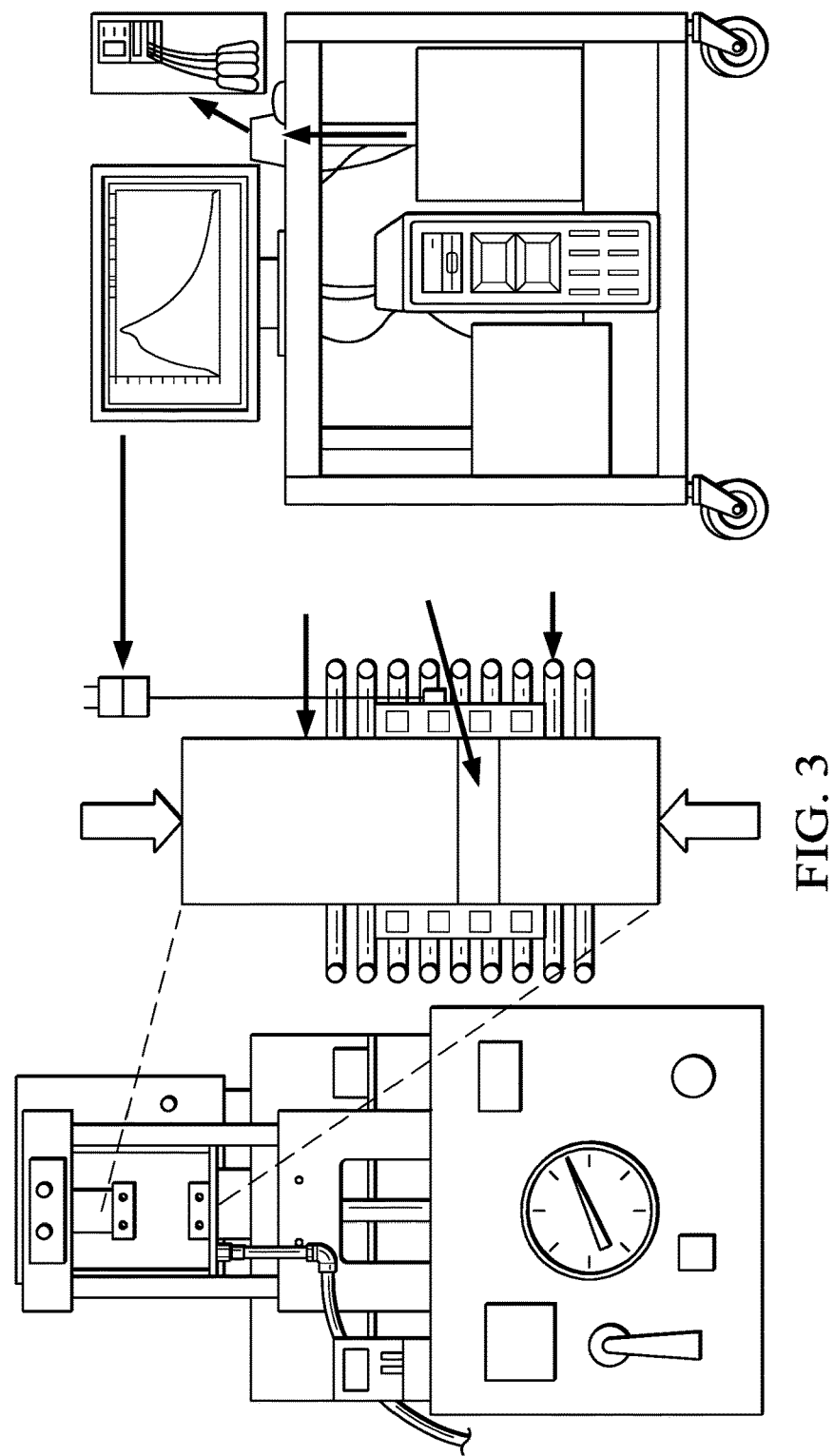
FIG. 3. (Left) French-press and custom designed heater system used to sinter chitosan and chitosan-milled soot samples (Center) heater and die demonstrated in pictorial form. (Right) PC-based-DAQ thermal analysis system.

Samples were prepared using 80% deactylated chitosan (Carbomer Inc, San Diego Calif.) and commercially available fullerene soot (SES Research, Houston Tex.). Mechanical milling was conducted on a SPEX apparatus for 6 and 30 h for the chitosan and 0.5-3 h for the fullerene soot. The chitosan-milled soot composite samples were mixed at a 98:2 weight ratio (chitosan-milled soot) and milled together for an additional 1.5 h. The sintering was performed on a custom made French press-heater (FIG. 3).

The temperature was monitored via high speed, high resolution data acquisition system (NIcDAQ-9174: National Instruments, Austin Tex.) as shown in FIG. 3. The same system was used to collect the data for thermal analysis, but this process was carried in a tube furnace. The sintering was conducted at 180 and 220° C. for 3 and 12 h under a constant pressure of 3.5 MPa through the entire sintering process. All experiments were carried out in a helium atmosphere. The temperature during sintering was measured in close proximity to the die (see FIG. 1). Through calibration of the equipment, we determined that the sintering temperature can be up to 30° C. lower to that measured by the thermocouple. We used this temperature to offset the collected data.

Hardness testing was performed on all samples using micro and nanohardness methods. For microhardness we used the Vickers method on a M-400-G Lecco apparatus with a load of 150 g-f and dwelling time of 10 s. The nanohardness was performed in a Hysitron TI-900 TriboIndenter™ system with real-time data collection. The reported values are the average of 6 measurements. The applied load was 1000 µN. The system has a 1 nN and 0.0004 nm resolution in loading and displacement respectively. X-ray diffraction (XRD) was measured with a D5000 SIEMENS diffractometer at Kα=0.15406 nm. The crystallinity index is determined based on the expression: CI %=[($I_{110}-I_{am}$)/I110]*100 where CI % is the crystallinity index, I110 the intensity (arbitrary units) of the reflection (110) for the β-phase and $I_{am}$ the intensity of the amorphous phase (α) [14, 15]. The presence of the γ-phase is not possible by the use of a similar XRD expression. The SEM observations were carried out on a FEI XL-30FEG on secondary electrons. Finally, a Raman analysis was done on a confocal micro-Raman microscope XploRA™, Horiba JY. A 638 nm diode laser was used for excitation.

Results

SEM and XRD characterization of the raw materials are shown in FIG. 2. The SEM image of chitosan shows a chunky structure with a regular distribution of particles of various sizes. The XRD results indicate that chitosan has a defined crystalline structure. The XRD results suggest that chitosan is composed of both, α and β, phases with a crystallinity index of 57. The fullerene soot is characterized by the fluffy appearance (FIG. 4c). FIG. 4b shows the presence of fullerene and a short range ordered phase (identified as $(002)_{Gr}$), characteristic of the basal plane of graphite. The fullerene soot is the byproduct, leftover, after the recovery of fullerene produced by the Kratschmer method. Fullerene is expected since the soot is the byproduct after the fullerene removed. The supplier indicates that fullerene is present on traces and no more than 1 wt % is present in the soot that is in agreement with the observations.

FIG. 4d shows an integrated Raman spectrum of the fullerene soot with bands of $C_{60}$; one fundamental and one second-order combinational identified at 710 cm$^{-1}$ (Hg(3)) and at 2898 cm$^{-1}$ ($A_g(2)+H_g(7)$), respectively. The other Raman bands of $C_{60}$ are weaker and they may be hidden under the G and D bands of graphitic carbon. The main Raman bands are D, G and 2D bands of graphitic (sp$^2$) carbon at 1318 cm$^{-1}$, 1578 cm$^{-1}$, and 2660 cm$^{-1}$, respectively. Graphitic carbon may also contribute to the band at 2898 cm$^{-1}$ through the D+G two-phonon scattering channel. The estimated average lateral size of graphitic particles is 40 nm.

Figure 5:
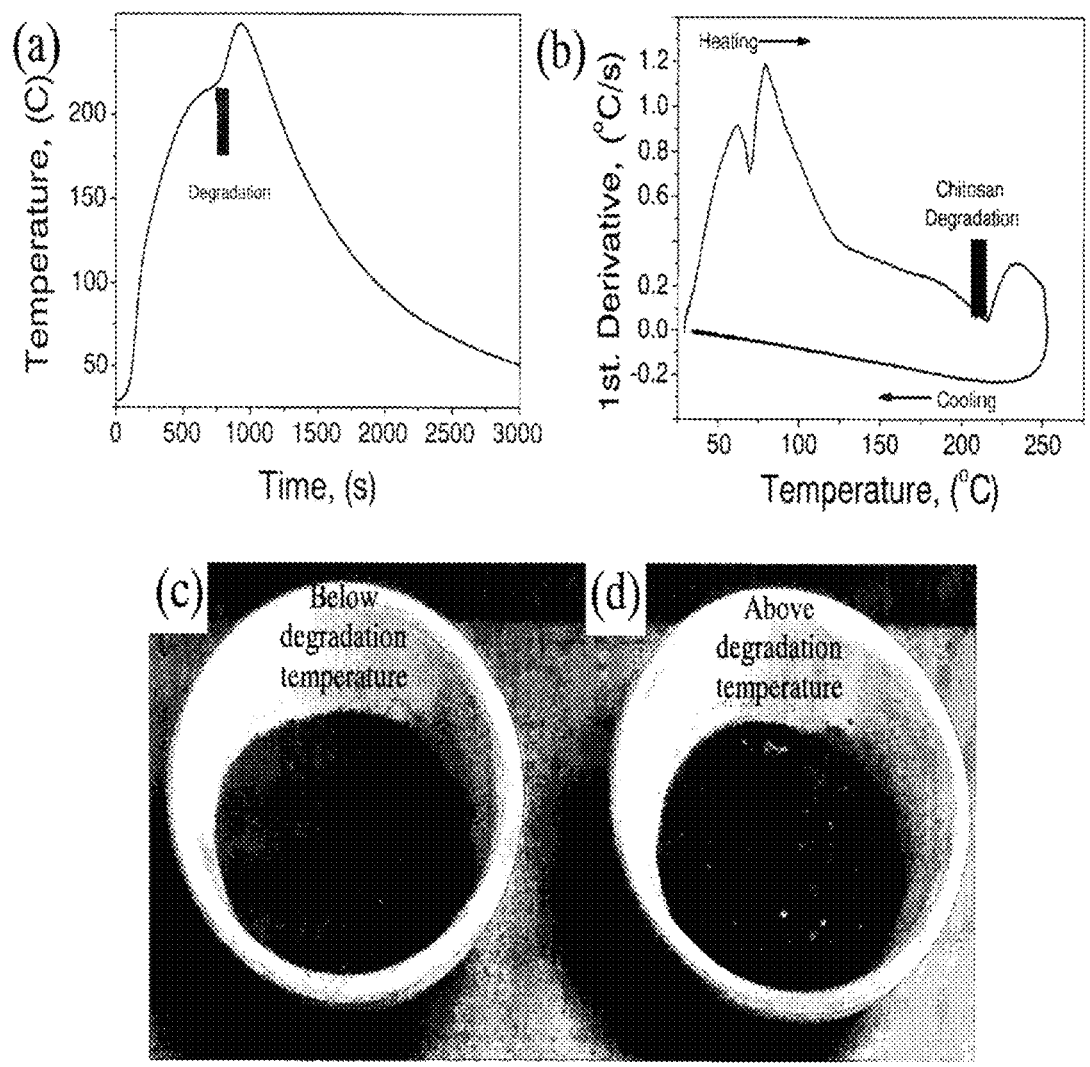
FIG. 5. (a) Heating/cooling curve for chitosan and (b) the first derivative of the heating/cooling curve. Samples of chitosan before (c-left) and after (c-right) the degradation temperature.

FIG. 5 shows the heating/cooling and first derivative of temperature with respect to time for the raw chitosan (80% deacetylation). The heating/cooling curve demonstrates the presence of phase transformations. The optimal sintering temperature is near, but below the degradation temperature. Temperatures above degradation damage the chitosan permanently with negative consequences for sintering. This deterioration is observed in FIG. 5b by the exothermic reaction (likely burning) taking place above 215° C. and it is confirmed by the discoloring ashy appearance of the loose material. Based on the collected information we used the criteria that sintering temperature (Ts) should be conducted at $T_S=(0.8–0.9)·T_T$, where $T_T$ is the transformation (in this case degradation) temperature in K. These conditions were set to guarantee that the minimum activation energy requirement for sintering are met at temperatures below degradation to reduce sintering time. The approximate weight loss in the sample seen in FIG. 5c,d are 12 and 30 wt % in weight respectively.

Figure 6:
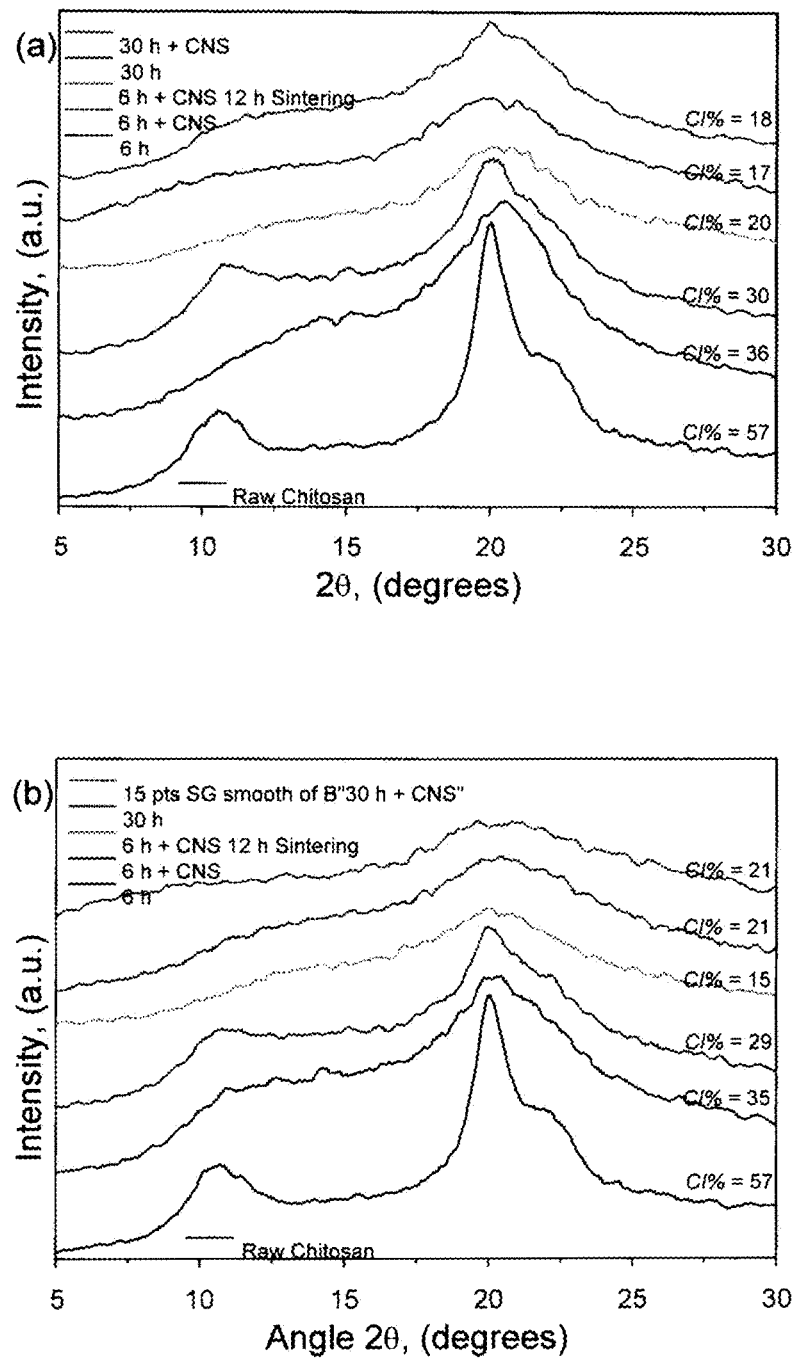
FIG. 6. XRD results of sintered chitosan and chitosan-milled soot composites sintered at (a) 180° C. and (b) 220° C. CI % stands for the crystallinity index. All samples were sintered for three hours except for the raw chitosan that was only pressed during sintering and a sample that was sintered for 12 h. In graph key for FIG. 6a shows intensity levels from top to bottom, with top being 30 h+milled soot and bottom being 6 h. In graph key for FIG. 6b shows intensity levels from top to bottom.

The XRD results are presented in FIG. 6 for the sintered samples at 180° C. and 220° C. Both figures demonstrate that milling time lowers the crystallinity index. It is also interesting to see that the presence of milled soot slightly reduced the CI %. The major contributor to the reduction of the CI % seems to be the sintering time. This effect is observed by the enhancement of the α phase of chitosan that is also known as the amorphous phase. The samples milled for 6 h have comparable CI % except for that one sintered for 12 h that has the lowest CI % of 20 suggesting that sintering time has a more a negative effect on crystallinity than milling time.

Figure 7:
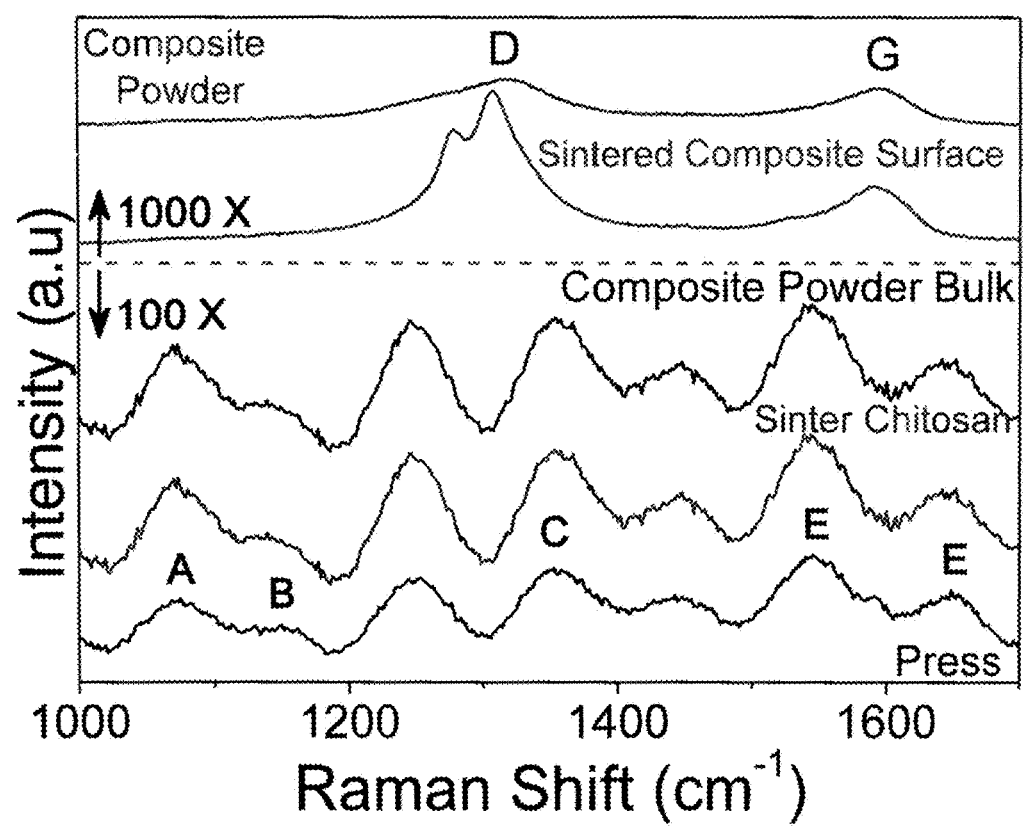
FIG. 7. Raman analysis of the chitosan and chitosan-milled soot composites. Notice the significant differences in the Raman spectra at the different magnifications used in the present work. Note: the following samples were observed at 100×: chitosan, sinter chitosan and composite powder; while a 1000× magnification was used for the composites (sintered and powder).

Raman characterization was conducted to observe the effects of milling and sintering on chitosan and to show the effects of carbon nanostructures on the composites in powdered and sintered forms. The analysis conducted in bulk (100× magnification) on the powders, sintered chitosan and sintered chitosan-milled soot composite are almost identical (FIG. 7). At this magnification Raman active bands in the powder as well as the composites before and after sintering can be identified. At 1087 cm$^{-1}$ the skeletal vibration C—O stretching generally related to the saccharide structure typical of chitosan. The anti-simetric C—O—C bridge is the band observed at 1154 cm−1 and it is indicated with a B. The identification of the Raman bands correspond to the C—H bending at approximately 1381 and 1423 cm$^{-1}$ and are identified as C and E in FIG. 7 respectively. The N—H bending mode is typically found at 1598 cm$^{-1}$ and corresponds to the primary amine group (letter F).

From FIG. 7 it is evident that magnification makes a difference in the Raman analysis. Using a magnification of 1000× the Raman analysis goes from bulk to discrete allowing a clear identification of the carbon in the chitosan-milled soot composite. Fullerene is not identified by Raman in the composite because its presence is in parts per millions compromising its identification. The carbon milled soot are identified by the G and D bands. These are the two most common bands of carbon. The G band is also called the graphite band and related to graphitic bonding (sp$^2$). The D band is the defect band that is usually active in nanostructured graphitic particles. Due to the relative intensity among the D and the G bands it can be concluded that the carbon used in this work has a graphitic nature with a high density of defects. The D band should not be confused with the diamond band that is a narrow and sharp at 1334 cm$^{-1}$. The magnification demonstrate that the carbon nanostructures are located at the surface of the chitosan as coating promoting superior sintering of the composite.

Figure 8:
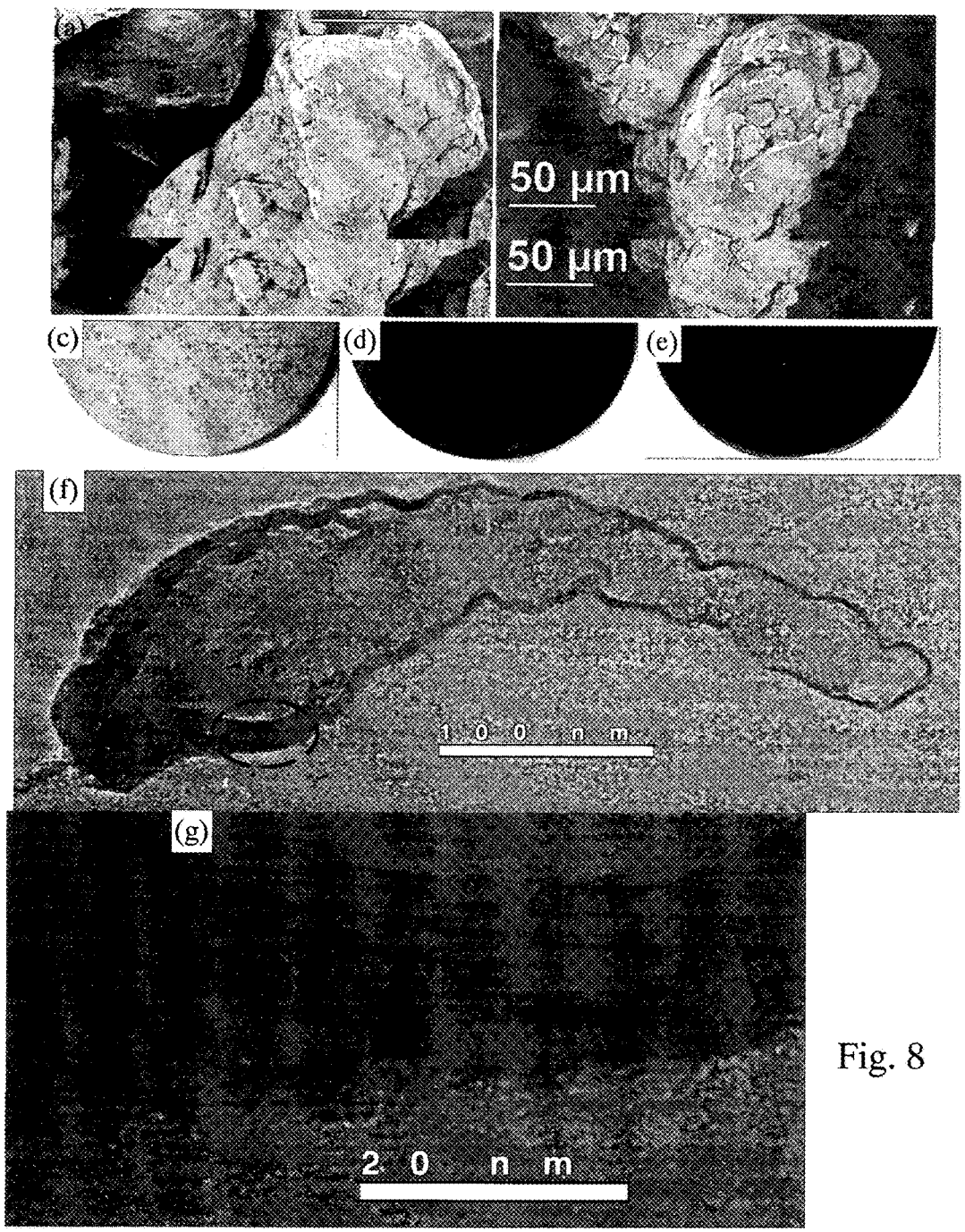
FIG. 8. Scanning electron micrographs of the (a) chitosan powders (b) the chitosan-milled soot composite milled for 6 h. Sintered samples at 180° C. of (c) chitosan, (d) chitosan-milled soot composite and (e) chitosan-milled soot composite sintered at 220° C. Note: the diameter of the sintered samples is 25.4 mm. HRTEM images are presented in (f,g); micrograph in (g) corresponds to the encircled area in (f) at higher magnification to depict the graphitic nature of the milled soot having a d-spacing of 0.34 nm.

FIG. 8a-b shows micrographs of the powders before and after milling. The powder before milling is composed of particles of approximately 50 µm or larger. After milling the powders agglomerate into clusters that are carbon coated along their surface. Pictures of the sintered samples are given in FIG. 8c-e. The change in color in the composites is attributed to the carbon additions. The chitosan has an off-white color while sintering results in a browning of the material. The chitosan-milled soot composites are highly homogeneous as shown by their consistent dark color at only 2 wt % of added milled soot. HRTEM images of the milled soot are presented in FIG. 8f-g. Those figures show that the CNS have graphitic nature with interatomic distance of 0.34 nm similar to that on graphene. The crystal size of the graphite particles is about 40 nm as calculated in our previous work.

Figure 9:
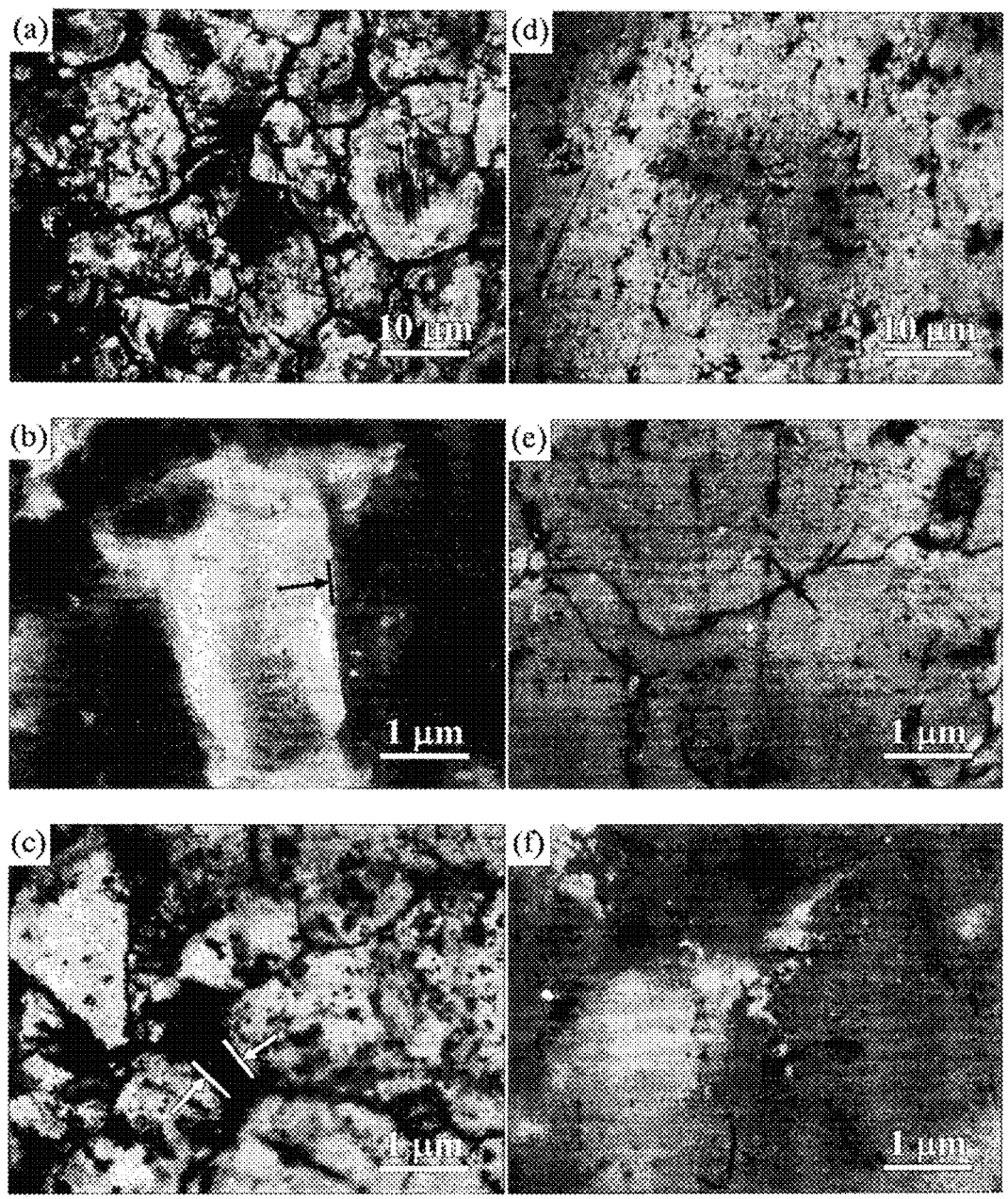
FIG. 9. Optical characterization of the (a,b,c) chitosan samples and (d,e,f) chitosan-milled soot composites. Sample (a) was compacted at room temperature, samples (b-f) are the sintered samples. The sintered samples at 180° C. are (b,d,e) and the samples sintered at 220° C. are (c,f). All micrographs correspond to a sintering under a constant pressure of 3.5 MPa for 3 h. Arrows are used to indicate the gaps along the grain boundary.

FIG. 9 shows optical micrographs of chitosan and chitosan-CNS composites. In FIG. 7a the compacted chitosan and FIG. 9d the chitosan-CNS composite sintered at 180° C. In the chitosan samples the grain boundaries are wider than those in the sintered samples. This results from the expected low cohesion among the chitosan particles that is improved with the sintering conditions and CNS additions. The grain boundaries in the chitosan-CNS composite are relatively difficult to identify; although, some porosity is still present, but in lower amounts and smaller sizes. In the higher magnification images, it is possible to visualize the grain boundary and the effect of temperature and carbon in the chitosan-CNS composite. The arrows in FIGS. 9c-f are used to indicate the grain boundary. In the chitosan sintered samples, this gap is 2-4 µm range. In the case of the chitosan-CNS composite the gaps is sub-micrometric (1-2 orders of magnitude smaller).

Table 2 summarizes the microhardness testing results of the chitosan and the chitosan-CNS composites. The chitosan samples show the lowest hardness in particular when they are sintered at 180° C. When the chitosan samples are sintered to 220° C. the hardness increases. The samples were sintered using a 3.5 MPa of constant loading. However larger milling times (30 h) seem to have a negative effect on hardness. The contrary is observed with the addition of CNS. A direct comparison among the hardness in the chitosan sintered samples with that in the composites show improvements of 14-15% for the samples sintered at 180° C. and only 13% difference when sintered at 220° C. Sintering for 12 h compared to 3 h does not seem to affect hardness. The consistency of the pressed sample without sintering is so delicate and weak that hardness measurements were not possible. Therefore if we compared the results with that sample we can conclude that the composite has appreciably higher mechanical properties.

TABLE 2

| Sample | Milling Time | Microhardness (p.HV) 180° C. | 220° C. |
|---|---|---|---|
| Chitosan | 6 h | 18.4 ± 5.4 | 23.1 ± 1.6 |
| Chitosan | 30 h | 15.1 ± 0.7 | 23.6 ± 0.1 |
| Chitosan-CNS Composite | 6 h | 21.2 ± 2.5 | 26.1 ± 2.7 |
| Chitosan-CNS Composite | 30 h | 17.6 ± 1.8 | 24.1 ± 0.6 |
|  |  |  | 26.2 ± 0.8* |

*Sample sintered for 12 h

Figure 10:
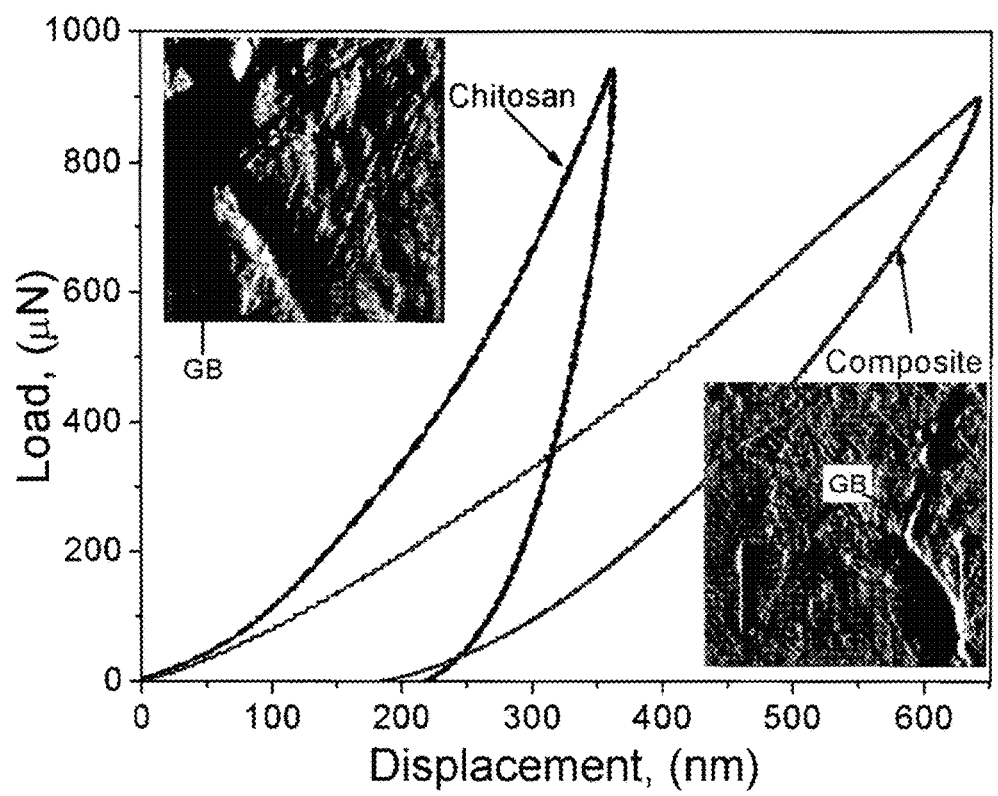
FIG. 10. Nanohardness results for the chitosan and chitosan-milled soot composites milled for 6 h, and sintered for 3 h at 220° C. The insets are tapping mode images from the nanoindentor, in the chitosan samples the dotted circles are used to identify the Berkovich impressions. Note: the Berkovich impressions in the chitosan-milled soot composite were not identified. Demonstrating the high resistant to permanent damage of the carbon nanostructures and an unprecedented elastic behavior in the composite.

FIG. 10 shows the results of nanohardness for the chitosan and chitosan-CNS composites. The respective hardness values are 265 and 287 MPa that represent an 8% improvement. The elastic moduli are 7.0 and 2.1 GPa that correspond to a 73% increase in the chitosan sample. The recovery for the chitosan is 42% while the recovery for the composite is 72%. This recovery and elastic deformation observed in the composite is unique and is directly attributed to the additions of CNS. The nanohardness indentations were resolved by the scanning system in the chitosan, but were not observed in the chitosan composite. This phenomenon is attributed to the elastic behavior resulting from the CNS that allows for a better recovery of the composite. The grain boundary in the chitosan sample is larger than that of the composite confirming the results presented in FIG. 9.

Discussion

Thermal analysis is an effective method to control the phase transformations occurring during the heating of chitosan. These phase transformations have distinct heat transfer characteristics as indicated by the change in slope of the heating/cooling curves. The first derivative of temperature with respect to time vs. temperature not only determines the transformations but the level of reversibility of the sample as well. The algorithms reported in were designed to determine the fraction of the material that is changing phase or "fraction transforming". Heating an organic material above the degradation temperature decomposes it; such phenomenon is presented in FIG. 3a-b. The irreversibility, in this case, is attributed to the burning of chitosan. Therefore, proper sintering of chitosan must be conducted at temperatures close, but below, that when chitosan starts degrades.

Figure 4:
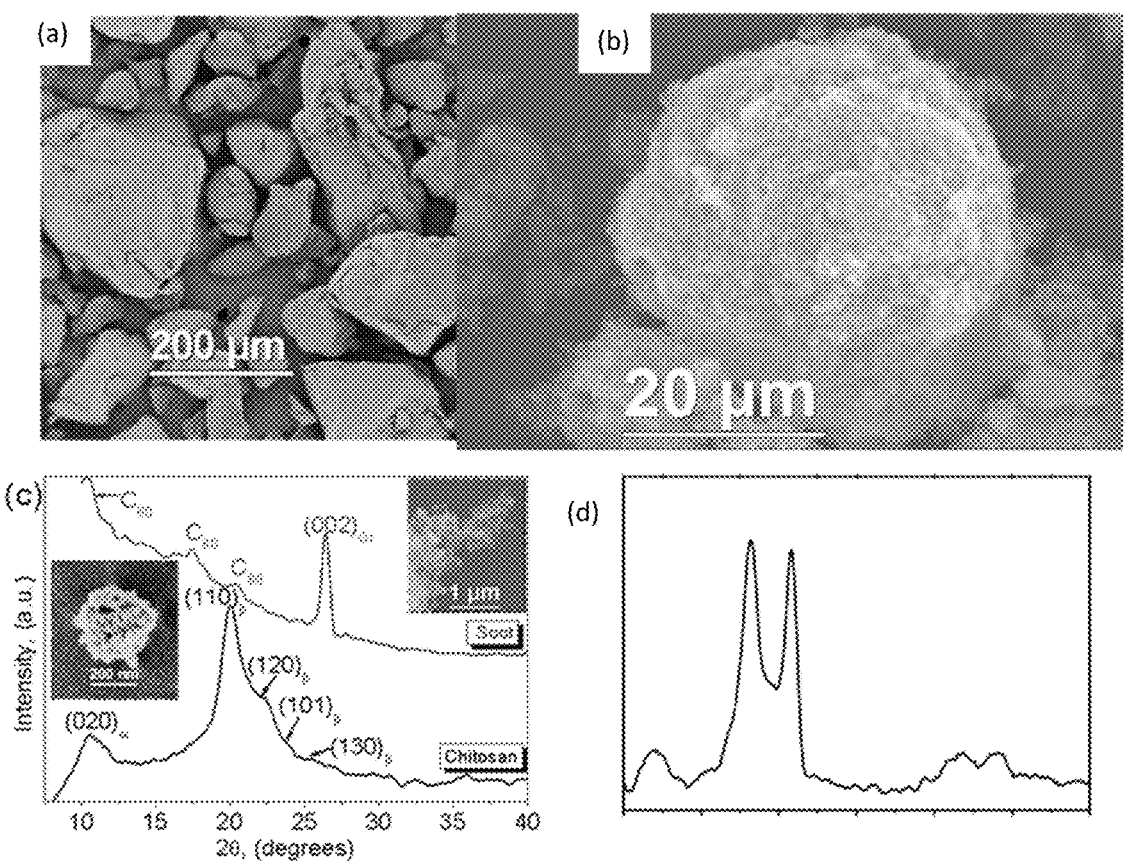
FIG. 4. Characterization of the raw (a,c) chitosan and (b-c) soot by means of (a,b) scanning electron microscopy, and (c) X-ray diffraction.

Comparing FIG. 3-5 it can be observed that after the degradation temperature chitosan transforms to ashes. On the other hand mechanical milling affects the crystallinity of chitosan as seen from the XRD results. This does not imply that the bonding structure is affected; in fact, the Raman results of before and after the milling are identical. Nonetheless, the microhardness of the samples is negatively affected up to 20%.

Mechanical milling is an effective method to refine the grain structure of chitosan and it helps to develop an even distribution of particle sizes. Additionally, it allows the proper formation of a composite by dispersing the CNS homogeneously. This can be confirmed by the uniform change in coloration. This in turn allows a better sintering potential as shown in FIG. 6 and FIG. 7 and further confirmed by the improvements in hardness shown in Table 1. The ultimate contributor to the integrity and consistency of the composite is the presence of CNS. However, at the nanoscale the composite does not seem to have significant improvements on hardness; nonetheless, the elastic characteristics of the composite improve significantly (FIG. 8) allowing an almost full recovery of the material. Further, this prevents the proper observation of the nano-indentation. It is of interest that only 2 wt % of CNS is sufficient to have such improvements in mechanical properties. The elastic modulii, hardness, and recovery of the composite presented herein are superior to those previously reported in composites reinforced with nanotubes and uncrossed-linked chitosan. We attribute this elastic behavior to the graphitic nature observed in the milled soot as seen in FIG. 5.

The single layer graphene had reported outstanding elastic behavior and self-healing mechanisms numerically and experimentally. Both mechanisms may be responsible for the elastic properties observed in the investigated composites. The graphitic nature of the milled soot used in this work was reported in our previous work, which in this work is observed in the XRD and Raman results presented herein.

Example 3

Ultra-Ductile and Low Friction Epoxy Matrix Composites

We present the results of an effective reinforcement of epoxy polymer matrix with fullerene carbon soot. The soot-epoxy composites show a remarkable increase in tensile elongation of more than 13% in 1 wt % soot composite—an indication for a change of the failure mechanism in tension from brittle to ductile. Additionally, the coefficient of friction is reduced from 0.91 in plain epoxy to 0.15 in the 1 wt % soot composite. The lateral forces during nanoscratch decrease as much as 80% with an enhancement of the elastic modulus and hardness by 43% and 94%, respectively. The epoxy composites containing 1 wt % of fullerene soot can be strong candidates for coating applications.

Methods

The fullerene soot is produced by the Kratschmer method and is the byproduct obtained after the purification of fullerene. The soot used in the present work has less than 1 wt % fullerenes ($C_{60}$ and $C_{70}$). Fullerenes are identified by XRD and Raman.

Resin (Epilox® T 19-36/700) is a commercially modified, colorless, low viscosity (650-750 mPa·s at 25° C.) epoxy resin with reduced crystallization tendency (density=1.14 g/cm$^3$). Its main components are Bisphenol A (30-60%), Crystalline silica (quartz) (1-10%), Glycidyl ether (1-10%), Inert fillers (10-60%). Hardener (H 10-31) is a liquid, colorless, low viscosity (400-600 mPa·s) modified cycloaliphatic polyamine epoxide adduct. Cross linker (Epilox® Hardener H 10-31) is a commercially modified colorless liquid, low viscosity (400-600 mPa at 25° C.). Both the hardener and the cross linker have a density of 1 g/cm$^3$, having as main components the 3-aminomethyl-3,5,5-trimethyl-cyclohexylamine benzylalcohol and Benzyl alcohol.

Resin (T 19-36/700), cross linker and filler CS were thoroughly mixed in specific ratio with mechanical stifling (20,000 RPM for 2 minutes). A subsequent sonication step (ultrasonic frequency 37 KHz for 15 min) followed by degassing in vacuum were performed to make sure that all trapped bubbles were completely removed. Before the onset of polymerisation, the polymer was set into the mould. Handling strength for these composite occurs in 24 hours and complete curing occurs in 5-7 days, both at 25° C. For faster curing the moulds were kept in the oven at 90° C. for 1 hour or 70° C. for 4 hours. Samples were prepared with two different CS concentrations: 1 and 3 wt %.

X-ray diffraction (XRD) was carried out using a D5000 SIEMENS diffractometer, with a Cu tube and a characteristic $K_\alpha$=0.15406 nm operated a 40 kV and 30 A. The scanning electron microscopy (SEM) observations were carried out using two field emission SEM's. One is a FEI XL-30FEG and the other is a FE-SEM, Zeiss Supra 40 connected to an Energy dispersive X-ray spectroscopy (EDS-Oxford Inca Energy 450). The high resolution transmission electron microscope observations (HRTEM) were carried in a Jeol 2000FX, operated at 200 kV. All images were analyzed in Digital Micrograph 3.7.1 software. X-ray photoelectron spectroscopy (XPS) was conducted on a Physical Electronics XPS Instrument Model 5700, operated via monochromatic Al-$K_\alpha$ X-ray source (1486.6 eV) at 350 W. The data analysis was conducted on Multipak™ software and the Shirley background subtraction routine had been applied throughout.

The raw powder was analyzed before and after calorimetric analysis with Raman using a Renishaw Micro Raman system with green laser line (wavelength: 514 nm) equipped with a Charged-Coupled Device as a detector. The microscope used a 50× objective lens to focus the laser beam on sample surface, and the size of the focused laser spot on the sample has a diameter of a few micrometers. The composites were analyzed in a confocal micro-Raman XploRA™, Horiba JY using a Raman excitation green laser of a 532 nm at 1000× magnification.

For the characterization of mechanical properties, a defect-free region of the sample surface was selected by atomic force microscopy imaging prior the indentation test. Indentation measurements were conducted using a Ubi1 instrument (Hysitron, Minneapolis). The machine compliance and the area function of the tip were calibrated before the indentation test using a fused silica sample (ASMEC, Germany). The loading and unloading segments in trapezoidal three-segment load function were each completed over a time of 30 s irrespective of the maximal load ($F_{max}$). $F_{max}$ was kept constant for 30 s. A reference sample of polycarbonate (ASMEC, Germany) was additionally measured to test the calibration condition of the device.

A set of 36 indents was carried out in a symmetric matrix spaced with a maximum load of 180 µN, where each indentation imprint is separated at least 4 µm to each other to avoid the influence of the stress fields around the indents and recording the load-penetration curve of each measurement. A 60 s delay at zero loads was established before and after each indent for thermal drift determination. The hardness is defined as $H_{IT}$=F/$A_c(h_c)$, where F is applied load and Ac is the contact area, which is itself function of the contact depth ($h_c$) as calculated by the Oliver and Pharr Method [Ref. W. C. Oliver and G. M. Pharr, "Measurement of hardness and elastic modulus by instrumented indentation: Advances in understanding and refinements to methodology," Journal of Materials Research, vol. 19, no. 01, pp. 3-20, March 2003]. For the reduced elastic modulus, the following equation was used. See equation 1.

$$1/E_r=1-v_i^2/E_i+1-V_s^2/E_s=(2/\sqrt{\pi})((\sqrt{(A_c)}(h_c))/S)$$ Equation 1:

Where E and v are the Young's modulus and Poisson's ratio and the subscripts, i and s associated to the indenter and sample, respectively. The contact stiffness, S=dF/dh is estimated from the first part of the unloading segment of the load-penetration curve. It is worth to mention that the viscoelastic effects on the determination of reduced elastic modulus were neglected in this work but deserve to be determined in a separate contribution.

At least 5 nanoscratch tests were performed in each sample using a Knoop tip in an IBISUMIS nanoindentation device in a steady load mode and varying the load between 5 to 9 mN with 1 mN increments. Each scratch test was done over a length of 500 µm, recording continuously the lateral force as well as the friction coefficient through a force sensor LVDT. A pre-scan was done for slope correction, which is done with the closed loop PZT direct acting normal force sensor that keeps the load for curved or sloping surfaces.

Results

Figure 12:
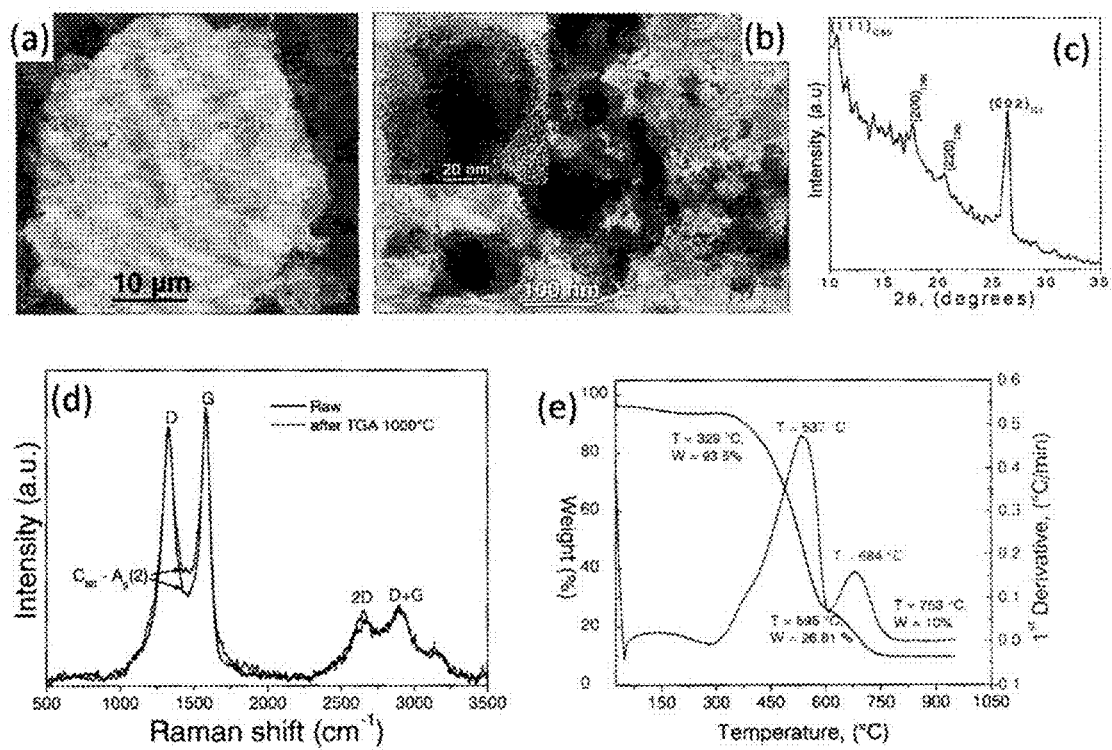
FIG. 12. Characterization of soot by means of: (a) SEM, (b) HRTEM, (c) XRD, (d) Raman and (e) TGA. In (d) the C60-Ag(2) refers to a Raman band of fullerene (C60). The inset in (b) is a magnified region of one of the soot particles.

A summary of carbon soot characterization results is presented in FIG. 12. The SEM micrograph in FIG. 12a reveals a fluffy morphology of carbon soot characterized by amorphous to short distance ordered carbon as well as nano-sized spherical carbon particles as seen in the HRTEM micrograph in FIG. 12b. The main XRD results presented in FIG. 12c are dominated by the (002) reflection of graphitic carbon and the x-ray signature of $C_{60}$ fulletite particles. The Raman spectra in FIG. 12d corroborate the XRD findings of graphitic structures with short lateral dimensions.

The TGA analysis demonstrates that the carbon is stable to temperatures of approximately 350° C. with a weight loss of less than 7 wt %. The weight loss of the carbon soot during the heating to 700° C. is another 83 wt %. We attribute the above weight reduction to the oxidation of the amorphous material first, followed by short-order graphitic structures. The remaining 10% was characterized by Raman showing comparable spectra to that seeing in the raw material. We presume that this remaining carbon is nano-structured and the particles are graphite-like.

The carbon soot was analyzed by EDS and XPS, the results are presented in Table 3. Both methods found soot content comprising only carbon and oxygen in the soot. The XPS results show a majority of carbon and the balance is oxygen. Similar results were obtained with EDS confirming the findings. According to the XPS results up to 95.75 wt % of carbon is $sp^2$ bonded, whereas the remaining carbon forms $sp^3$ bonds. Lack of diamond traces in all analysis suggests that $sp^3$ bonds are dangling bonds and C—O groups along some of the edge atoms in the benzoic rings.

The Raman D and G bands shown in FIG. 12d are typical for $sp^2$ rich carbon materials. The G band is due to the symmetric $E_{2g}$ carbon vibrational mode, allowed by Raman selection rules, whereas the D band is a product of defect-induced Raman scattering involving carbon vacancies, functional carbon-oxygen groups, and boundaries of nano-sized graphite particles. The second-order Raman 2D and D+G bands involving two phonons appear only in $sp^2$ material with translational order. The BET results indicate that the surface area of the soot is 161 m$^2$/g and a density of 1 g/cm$^3$. Concluding the soot is in the form of spheres composed of a mix of amorphous and graphitic structures with short range order and a high density of dangling bonds.

Table 3. Results of characterization of the soot by means of XPS, EDS and Raman. The grain size was calculated using the following model $L_\alpha(nm)=2.4\times10^{-10}L_{las}^4(I_g/I_d)$ where where $L_{las}$=638 nm is the excitation laser wavelength, and $I_G$ and $I_D$ are the Raman intensity of the D and G bands, respectively.

TABLE 3

| Elements | | Carbon Species | | |
| --- | --- | --- | --- | --- |
| C (at %) | O (at %) | Sp2 wt % | Sp3 wt % | Grain size nm |
| 94 | 6 | 95.75 | 4.25 | 40 |

Figure 13:
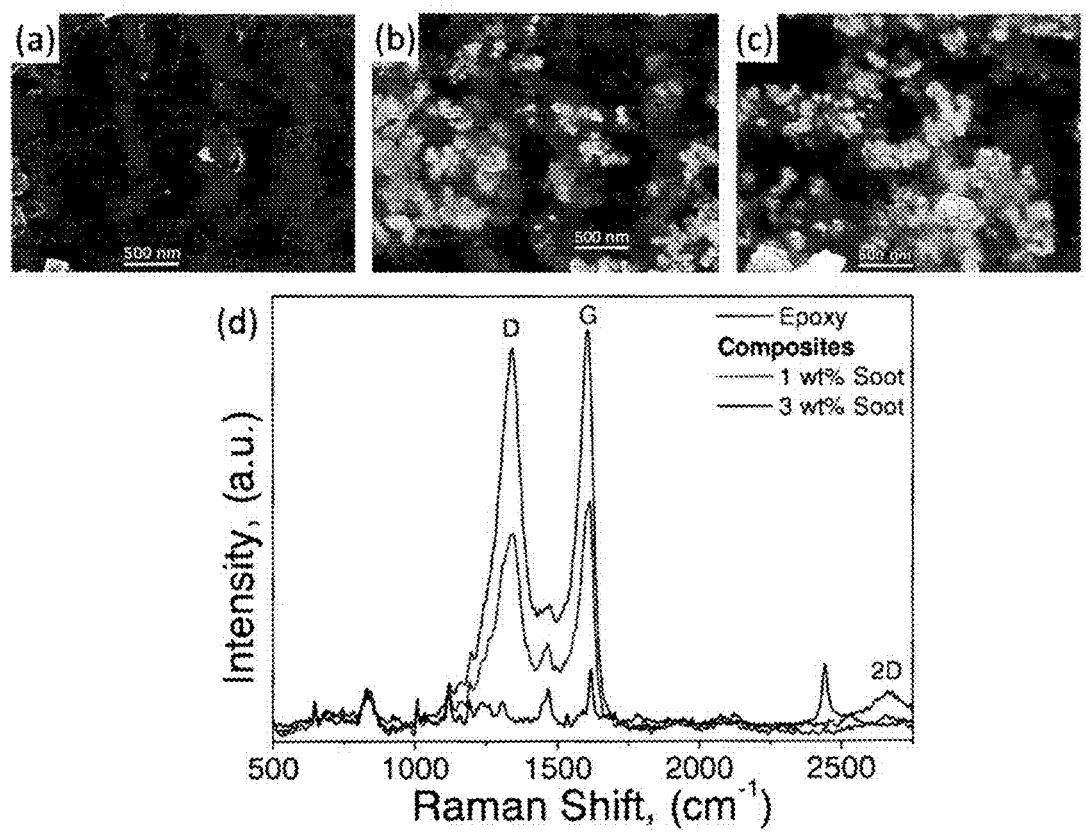
FIG. 13. SEM micrographs of (a) epoxy and composites with (b) 1 wt % soot, (c) 3 wt % soot and (d) Raman results of the epoxy and composites.

FIG. 13 shows the SEM images of the epoxy and the composites with 1 and 3 wt % soot. The surface morphology of epoxy and the composites is markedly different; the latter reveals clearly the embedded spherical nanostructures (100-150 nm) in the polymeric matrix. FIG. 13d shows that the epoxy Raman fingerprints are seen in the three investigated samples. The characteristic graphitic carbon band are clearly discernible and show little deviation from those observed in the raw soot (FIG. 12d) indicating that no apparent damage or modification of the soot. Therefore, from those results we conclude that no chemical interaction between the epoxy and the soot takes place; instead, the interactions are through van der Waals forces. As expected, the intensity of the carbon response increases with the amount of soot.

Figure 14:
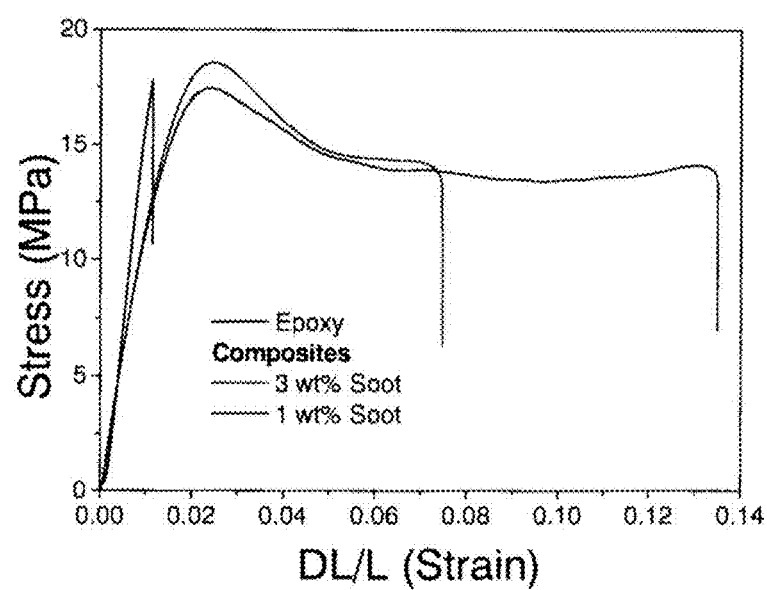
FIG. 14. Tensile testing results of the epoxy and the composites with 1 wt % and 3 wt % carbon.

The tensile testing results are presented in FIG. 14. The epoxy sample shows a stress-strain curve characteristic for a brittle material with almost no ability for plastic deformation and an ultimate tensile strength (UTS) of 17.7 MPa. The measured epoxy Young's modulus is 1.8 GPa. The composite with 1 wt % of soot presents a slight increase of 5% in UTS (18.6 MPa) whereas in that with 3 wt % soot the strength is comparable to that in the epoxy. The Young's modulus for both composites is approximately 2.04 GPa resulting in a 13.3% increase with respect to pure epoxy. The yield strengths are 13.2 and 12.3 MPa for 1 and 3 wt % soot additions respectively. The most important result, however, is the large increase of plasticity of the composites, particularly those reinforced with 1 wt % of soot reaching 13.2% elongation at a stress of 14.1 MPa. The composite with 3 wt % soot additions has a maximum elongation of 7.0% at a stress of 14.3 MPa. These results suggest that the elongation of the epoxy composites can be tuned by varying the soot loading. Furthermore, both composites show upper and lower yield strengths similar to those observed in low carbon steels. In other words, the elastic behavior is the result of a work-hardening mechanism developed in the tensile testing.

Figure 15:
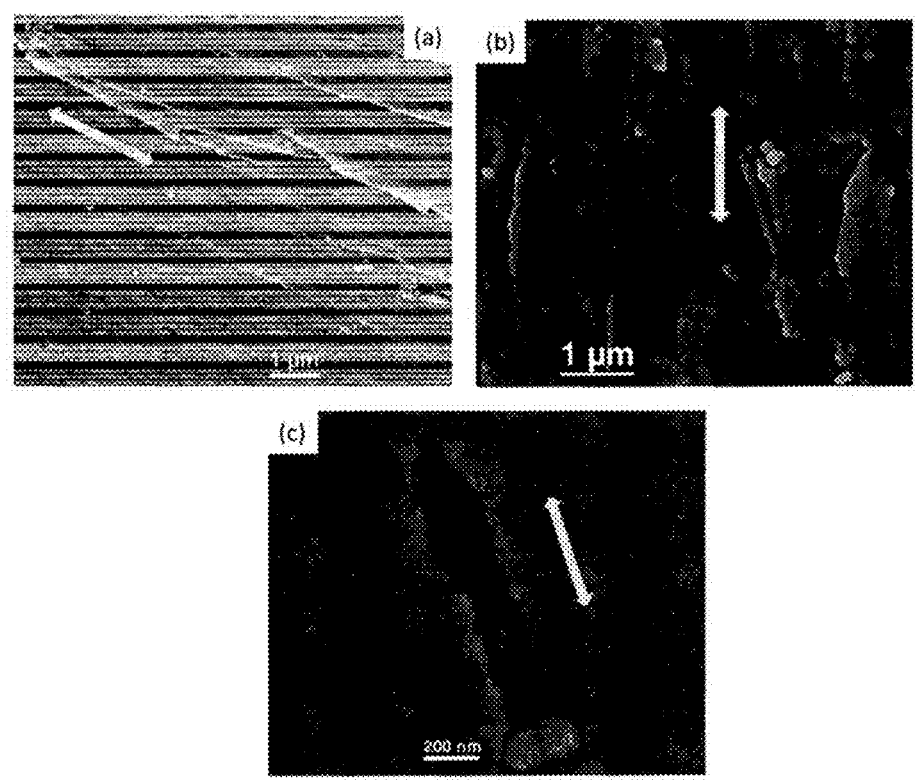
FIG. 15. SEM micrographs showing the effects of carbon soot particles on the epoxy-soot composite containing (a, c) 1 wt % soot and (b) 3 wt % soot. The arrow indicates the direction of the applied stress along.

FIG. 15 shows SEM micrographs for the composites. The spherical soot nanoparticles are discernible in both composites. This figure also demonstrates the role of the spherical soot particles in the work-hardening effect in epoxy composites—the particles act as anchors preventing the free crack grow. This mechanism is more effective in the composite with 1 wt % soot. Higher density of particles has a stress concentrator effect reducing the strengthening effectiveness of the soot. This is evident in the composite with 3 wt % soot. The strengthening mechanism is clearly depicted in FIG. 15c where a particle dragged effect is observed and an extended crack propagation is tapped by the soot particles. In the presence of higher density of particles this effect is also evident, however, it is not as effective resulting the development of larger cracks and the detachment of larger sections of epoxy. The particle distribution observed in the 1 wt % soot composite is more homogeneous and in the other composite the soot particles agglomerate. In both cases the strengthening mechanism is effective; nonetheless, agglomeration lowers the strengthening effectiveness of carbon soot.

Figure 16:
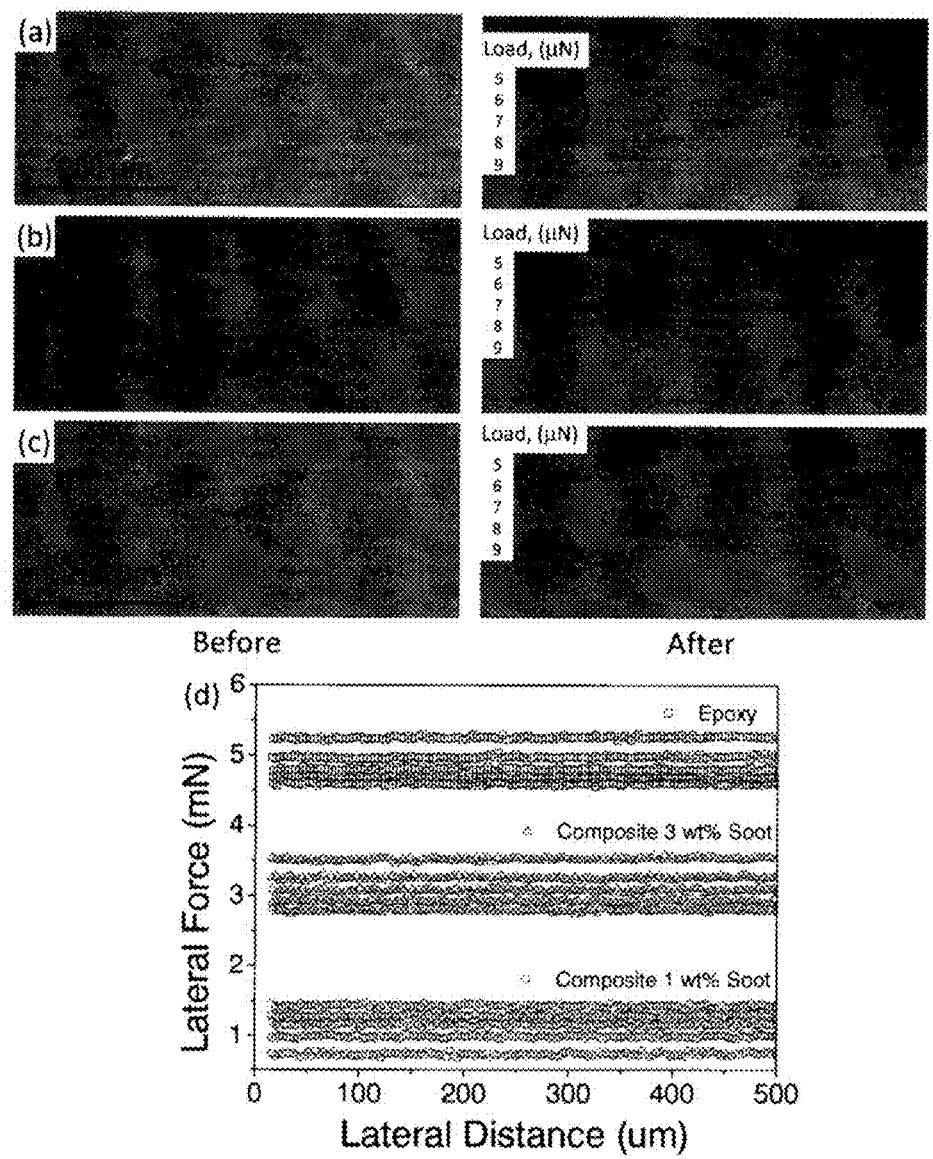
FIG. 16 Micrographs of the parallel nanoscratch test results on (a) epoxy, and composites with (b) 1 wt % C, (c) 3 wt % C and (d) lateral forces during nanoscratch test using a Knoop tip with loads between 5 to 9 mN with 1 mN increments at 30 μm intervals.

Additions of different amount of soot to the epoxy matrix show remarkable effects on its tribological behavior. A summary of the nanoscratch testing results is presented in FIG. 16, where the scratches along the surface on the investigated samples are clearly seen. The scratches were conducted using constant loads from 5 to 9 mN. FIGS. 16a, b and c correspond to the epoxy and the composites reinforced with 1 and 3 wt % soot, respectively. The load increases from the first to the last scratch as indicated in the figure and clearly evidenced by their thickness and depth. The deeper and more defined scratches are in the epoxy followed by the 3 wt % soot composite. This makes the 1 wt % soot composite the samples with less damage.

FIG. 16d depicts the lateral forces during the nanoscratch test. A steady state is reached in all tests such that the forces are essentially constant. The 1 wt % soot composite has the least resistance to the nanoscratch. This is a consequence of a lubricity effect ongoing on this composite. The composite with 3 wt % soot present an increase in the lateral forces. Potentially, this results from the agglomeration of the soot spheres that may contribute to further interactions within the matrix resulting in a reinforcement effect of the composite. Furthermore, the epoxy is the sample presenting the highest lateral forces (FIG. 16b-c). Besides the unprecedented plastic behavior in tension, the tribological properties of the composite present advantages over the epoxy. Those advantages include the decrease in lateral forces as well as the lubricity particularly in the 1 wt % soot composite.

Figure 17:
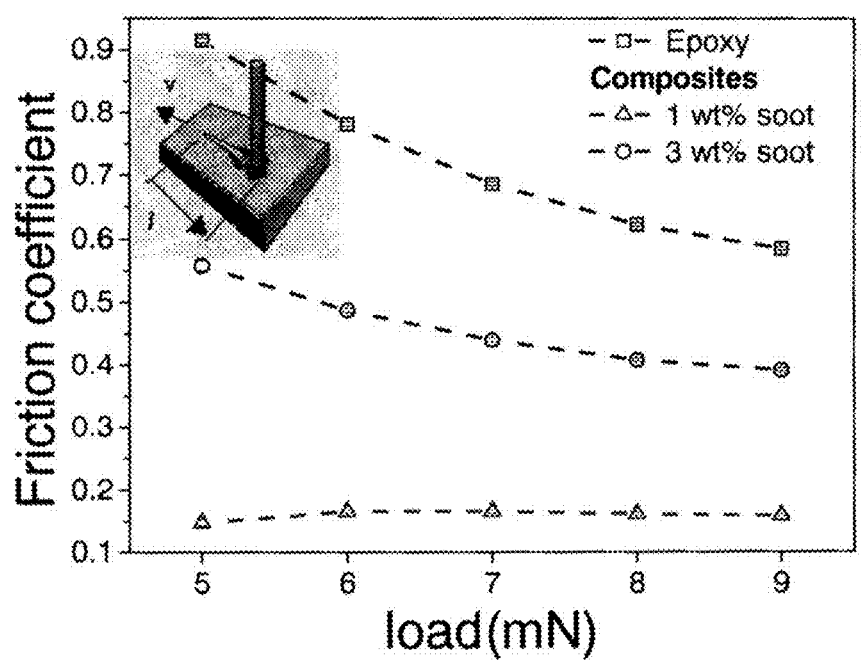
FIG. 17. Variations of friction coefficient as a function of applied normal load for the epoxy and the composites with 1 and 3 wt % soot.

The results of measurement of the coefficient of friction as a function of applied normal load are presented in FIG. 17. The friction coefficient in the 1 wt % soot composite varies little with the test load, whereas for the epoxy and the 3 wt % soot composite the friction coefficient decreases with loading. The respective reductions are from 0.91 to 0.59 when the load is increased from 5 to 9 mN. For the same condition in the case of the 3 wt % soot composite the values reduce from 0.56 to 0.39. The 1 wt % soot composite shows remarkable steadiness with a coefficient of friction consistently in the range 0.15 and 0.16. These demonstrates that the dispersion in epoxy of 1 wt % of soot leads to a decrease in the coefficient of friction up to 83% when using 5 µN load and 73% with 9 µN load.

Figure 18:
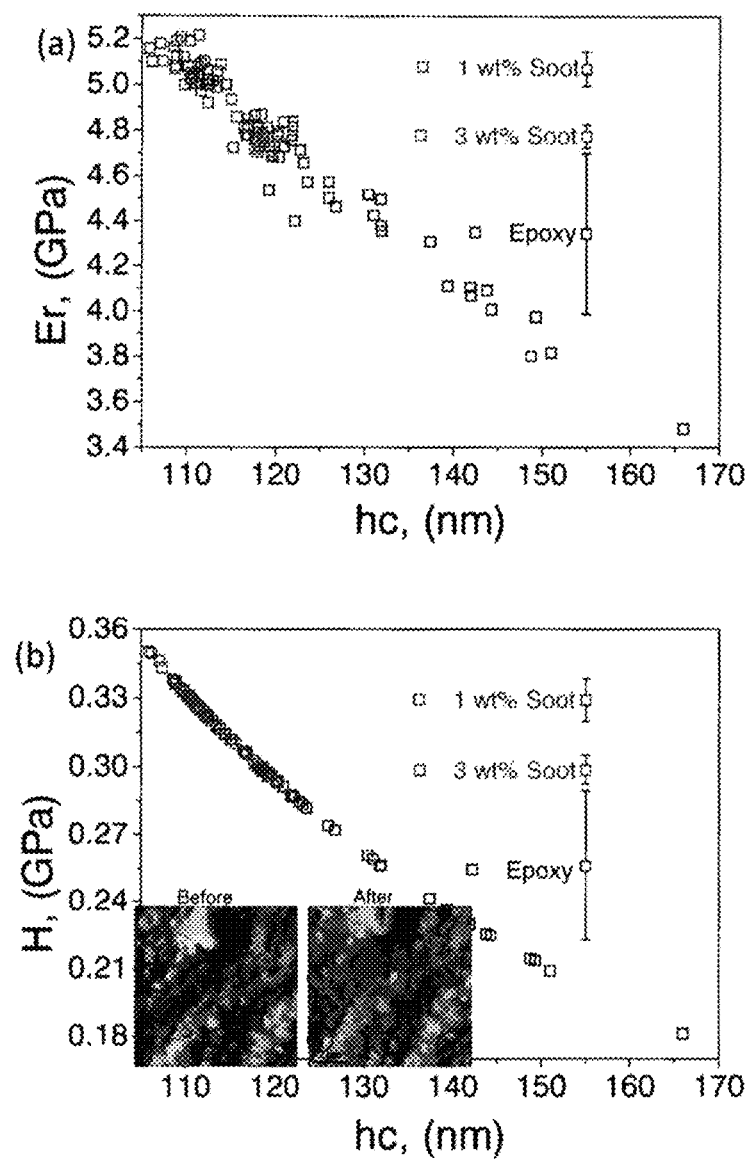
FIG. 18. Results of (a) modulus and (b) nanohardness for the epoxy and composites with 1 and 3 wt % soot. The scales at about 155 nm indicate the average values and the standard deviation for hardness and modulus respectively. The inset shows micrographs revealing the sample's surface before and after indentation, the red circles identify indentations.

The reduced elastic modulus and nanohardness results are presented in FIG. 18. Again, particularly for the elastic modulus, viscous effects were not taken into account in this contribution. Based on a direct comparison, both properties are improved in the composites respective to the epoxy. The data scattering (standard deviation) in both composites is also reduced. This is an indication of the higher homogeneity in the material and effective reinforcement of the carbon soot. The composites show improvements in the average elastic modulus of 9.9 to 16.7% and the corresponding improvements in hardness are 16.6 and 28.6% for the composites containing 3 and 1 wt % soot, respectively. A further advantage in the composite is the clear reduction in the dispersion of the data demonstrating higher homogeneity and reinforcement. Considering the best and worst cases for reduced elastic modulus and hardness the improvements are: 49.8 and 93.5% respectively.

The use of fullerene soot to reinforce epoxy matrix result in an appreciable increase of ductility, friction and hardness. This particular type of soot is resistant to temperatures of up to 329° C. in air, which make it suitable for use in fire retardant applications. The presence and morphology of the fullerene soot in the composite is clearly identifiable by means of Raman and microscopy. During tensile testing the Young's modulus of the epoxy is preserved in the composite; therefore, we presume that the epoxy (matrix) does not suffer major molecular changes. This is also confirmed by the similarity in the Raman spectra in the epoxy when compared to those in the composites.

We relate the remarkable increase of elongation of the epoxy composites to the dragging effect of the soot particles. The combination of size of the spherical soot particles (<160 nm) and loading of 1 wt % result in an optimal homogeneous dispersion of large surface area particles within the epoxy (FIG. 15). During the tensile tests, the stress is carried by the epoxy matrix until reaching the elastic limit. Further on, the carbon particles act as stress concentrators but because of their rigidness they start dragging. As a result both the dragging channels and carbon particles become crack development stoppers. There is, however, a specific balance between particle size and particle concentration that makes the effect significant. Increasing the amount of soot addition results in unwanted agglomerations that reduce the reinforcement effectiveness.

During the scratch test, the lateral forces in the epoxy compared to those in the composites show marked differences. Larger lateral forces are observed in the epoxy while the lowest are found in the composite with 1 wt % soot having a force reduction of approximately 80%. We attribute that to a potential lubrication mechanism occurring in the composites while dragging the soot particles. In addition, the composite with 1 wt % carbon has the highest hardness and reduced elastic modulus with the narrowest the scatter of the data.

CONCLUSION

The additions of fullerene soot in epoxy demonstrate overall improvements in strength, hardness, coefficient of friction, and modulus of the resulting composites. The most distinguishable result, however, is the change in failure mechanisms from brittle to ductile during tensile testing. A remarkable increase of elongation is observed from 0.7% in the epoxy to more than 13% in the composite with 1 wt % soot. In the same composite the coefficient of friction is reduced by 83% along with an enhancement of modulus and hardness by up to 49% and 93.7%, respectively. These mechanical properties of the 1 wt % fullerene soot epoxy composite make it a very strong candidate for coating applications.

The invention claimed is:

1. A reinforced polymer matrix, the polymer matrix made by combining carbon soot with a liquid polymer matrix to form a complex and hardening the complex to form a reinforced structure;
wherein the elongation at break of the polymer structure reinforced with soot is at least 40% greater than a hardened polymer structure that has not been reinforced with soot.

2. The reinforced polymer matrix of claim 1, wherein at least 90% of the carbon soot is sp2 bonded.

3. The reinforced polymer matrix of claim 1, wherein the density of the carbon soot is about 0.2-2 g/cm3.

4. The reinforced polymer matrix of claim 3, wherein the reinforced structure comprises 0.2 to 1% by weight of soot.

5. The reinforced polymer matrix of claim 4, wherein the soot increases the tensile strength of the reinforced structure as compared to a hardened polymer structure that has not been reinforced with soot.

6. The reinforced polymer matrix of claim 5, wherein a measurement of Young's modulus is at least 10% greater than the hardened polymer structure that has not been reinforced with soot.

7. The reinforced polymer matrix of claim 5, wherein the soot increases the average elastic modulus by at least 15% over the hardened polymer structure that has not been reinforced with soot.

8. The reinforced polymer matrix of claim 5, wherein the soot increases the hardness by at least 20% over the hardened polymer structure that has not been reinforced with soot.

9. The reinforced polymer matrix of claim 5, wherein the soot increases the average elastic modulus by at least 8% over the hardened polymer structure that has not been reinforced with soot.

* * * * *